(12) United States Patent
Maxham

(10) Patent No.: US 7,330,652 B1
(45) Date of Patent: Feb. 12, 2008

(54) SYSTEM AND METHOD FOR SELECTING THE PLACEMENT OF OPTICAL AMPLIFIERS IN AN OPTICAL NETWORK

(75) Inventor: Kenneth M Maxham, Belmont, CA (US)

(73) Assignee: Ciena Corporation, Linthicum, MD (US)

(*) Notice: Subject to any disclaimer, the term of this patent is extended or adjusted under 35 U.S.C. 154(b) by 790 days.

(21) Appl. No.: 10/037,085

(22) Filed: Dec. 20, 2001

Related U.S. Application Data

(60) Provisional application No. 60/258,154, filed on Dec. 21, 2000.

(51) Int. Cl.
*H04B 10/08* (2006.01)
(52) U.S. Cl. .............................. 398/37; 398/38; 398/79
(58) Field of Classification Search .................. 398/25, 398/79, 37, 38, 97; 700/36
See application file for complete search history.

(56) References Cited

U.S. PATENT DOCUMENTS 6,046,833 A * 4/2000 Sharma et al. ................ 398/48
6,275,329 B1 8/2001 Sieben ................... 359/337.13
6,304,347 B1 10/2001 Beine et al. ................... 398/38
2002/0036988 A1 * 3/2002 Cardwell et al. ........... 370/238

OTHER PUBLICATIONS

Ramamurthy, B. et al. Optimizing Amplifier Placements in a Multiwavelength Optical LAN/MAN: The Unequally Powered Wavelengths Case. IEEE/ACM Transactions on Networking, vol. 6, No. 6, Dec. 1998, pp. 755-767.*

* cited by examiner

*Primary Examiner*—Christina Leung
(74) *Attorney, Agent, or Firm*—Clements Walker; Christopher L. Bernard; Tyler S. Brown

(57) ABSTRACT

A system and method for selecting optical amplifier placement in an optical network is disclosed. In one embodiment, a design tool is used to configure the optical add/drop multiplexers of each nose. For nodes with more than a small number of nodes there are a large number of possible optical amplifier configurations. Consequently, a subset of optical amplifier placement configurations is formed. In one embodiment an algorithm is used to eliminate from consideration optical amplifier configurations unlikely to have satisfactory minimum power characteristics. In one embodiment the quality of service of each configuration of the subset is analyzed to determine an optical amplifier placement configuration having a minimal number of amplifier and a desirable quality of service.

34 Claims, 18 Drawing Sheets

SYSTEM AND METHOD FOR SELECTING THE PLACEMENT OF OPTICAL AMPLIFIERS IN AN OPTICAL NETWORK

RELATED APPLICATIONS

This application claims priority under 35 U.S.C. § 119(e) to U.S. Patent Application No. 60/258,154, entitled "Optical Network Amplifier Placement," by Kenneth Mark Maxham, which was filed on Dec. 21, 2000. The contents of U.S. Pat. App. No. 60/258,154 are hereby incorporated by reference in their entirety.

BACKGROUND OF THE INVENTION

1. Field of the Invention

The present invention relates generally to design tools for designing optical networks. More particularly, the present invention is directed towards a design tool for selecting the placement of optical amplifiers in the nodes of a dense wavelength division multiplexed (DWDM) optical network.

2. Description of Background Art

Dense wavelength division multiplexed (DWDM) networks are of interest for a variety of applications, such as metro area networks. FIG. 1 shows an exemplary prior art metro area network that is a ring network, although it will be understood that a variety of other network topologies are known in the art, such as linear and mesh topologies. Referring to FIG. 1, a DWDM optical network 100 typically comprises a plurality of optical nodes 130 coupled together by optical fibers 140. The group of optical fibers coupling two nodes is commonly known as a span. In metro area network (MAN) and regional area network applications the location of each optical node 130 is typically proximate a desired tributary service center (e.g., at a university, company, business park, etc.) Optical fiber 140 may correspond to pre-existing optical fibers already laid in the ground. Typically, the length and attenuation of the optical fibers 140 of each span of a MAN may vary over a wide range depending upon where the nodes are placed and the pre-existing fibers that are available to couple the nodes.

In a typical DWDM node the multiplexing/demultiplexing required to perform add, drop, and pass-through functions is commonly performed using several stages of multiplexers and demultiplexers. A common node design is to form a multi-stage add/drop multiplexer from a combination of mux/demux modules (also commonly known as "circuit packs"). The total number and placement of optical amplifiers in the nodes of the optical network needs to be selected to achieve a desired quality of service (QOS). Commonly, each input fiber to a node may have coupled to it either zero or one optical pre-amplifier and each output fiber may have either zero or one optical post-amplifier coupled to it.

As shown in detail for Node 1 and Node 3, each optical node 130 may include optical multiplexers/demultiplexers and other elements arranged to permit wavelength channels to pass through the node, wavelength channels to be added in the node, and wavelength channels to be dropped in the node. For example, optical band filter packs 150 and channel filter packs 160 in each node may be configured as add channels at nodes, drop channels at nodes, and pass through selected channels. Wavelength conversion interfaces 170 may be configured to detect the channel and generate an optical signal for a tributary network 180. Additionally, as indicated in Node 2, an optical node may include one or more optical amplifiers such as optical pre-amplifiers 190 (for channels entering the node) and optical post-amplifiers 195 (for channels exiting the node). Typically, a node is adapted to receive at least one optical pre-amplifier 190 for each input port of the node and at least one optical post-amplifier for the output port of the node.

Optical amplifiers, such as erbium doped fiber amplifiers (EDFAs) and semiconductor optical amplifiers (SOAs), are expensive and inject optical noise into the optical network. Consequently, it is desirable to select a minimal number of optical amplifiers necessary to achieve the optical amplification to achieve a desired quality of service (QOS). However, in MAN and regional area network applications the precise number and arrangement of optical amplifiers will depend on the particular network configuration and the services provided.

There is increasing interest in design tools to facilitate the design of optical networks, such as metro area networks. A user-friendly design tool would permit a network to be designed in a reasonable length of time with the resources of a conventional workstation or server. However, as DWDM networks have become more complex and include more optical nodes it is impractical to use conventional analysis techniques to design an optical network to have a minimal number of optical amplifiers and the desired QOS. This has serious implications, since the lack of an effective design tool may result in greater cost and reduced performance of the optical network than could be otherwise obtained if an automated design tool optimized the number and arrangement of optical amplifiers.

What is desired is a new system and method for designing optical networks having a large number of possible optical amplifier arrangements.

SUMMARY OF THE INVENTION

A system and method is disclosed for designing optical networks having a large number of possible optical amplifier placement configurations. In one embodiment, one or more optical power criterion are used to constrain the placement of one or more optical amplifiers in the optical network in order to form an initial placement of optical amplifiers. In one embodiment, the optical power criterion is a criterion indicative of a sufficient minimum receiver power in at least one receiver. In one embodiment, the optical power criterion is that an optical loss in a portion of the network exceeds a threshold optical loss such that an optical amplifier is required in a node location proximate the optical loss. A set of optical amplifier placement configurations that are consistent with the initial placement are then determined. In one embodiment, each member of the set is analyzed with a quality of service program to identify an optical amplifier placement configuration having a minimal total number of optical amplifiers and a desired quality of service.

In one embodiment of a computer aided design tool, a network configuration module configures the optical filter components of each node of the network in accord with a channel map. An amplifier placement selection module selects a subset of amplifier placement configurations from the set of all possible amplifier placement configurations; and a quality of service analysis module analyze the quality of service for each amplifier configuration of the subset of amplifier placement configurations and selects an amplifier placement configuration having a minimum number of amplifiers and a desired quality of service.

In one embodiment of an article of manufacture, an optical network is manufactured using the amplifier placement method to select the amplifier placement configuration.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention generally comprises selecting the placement of optical amplifiers in a wavelength division multiplexed (WDM) optical network in which each node is capable of receiving at least one optical amplifier. In one embodiment, the selection method is used to select a set of amplifier configurations that may be analyzed to design an optical network having a desired quality of service (QOS) with a minimum number of optical amplifiers. Each amplifier configuration is an arrangement of amplifiers in available node locations, such as an arrangement of amplifiers in locations reserved for optical pre-amplifiers and post-amplifiers.

Figure 1:
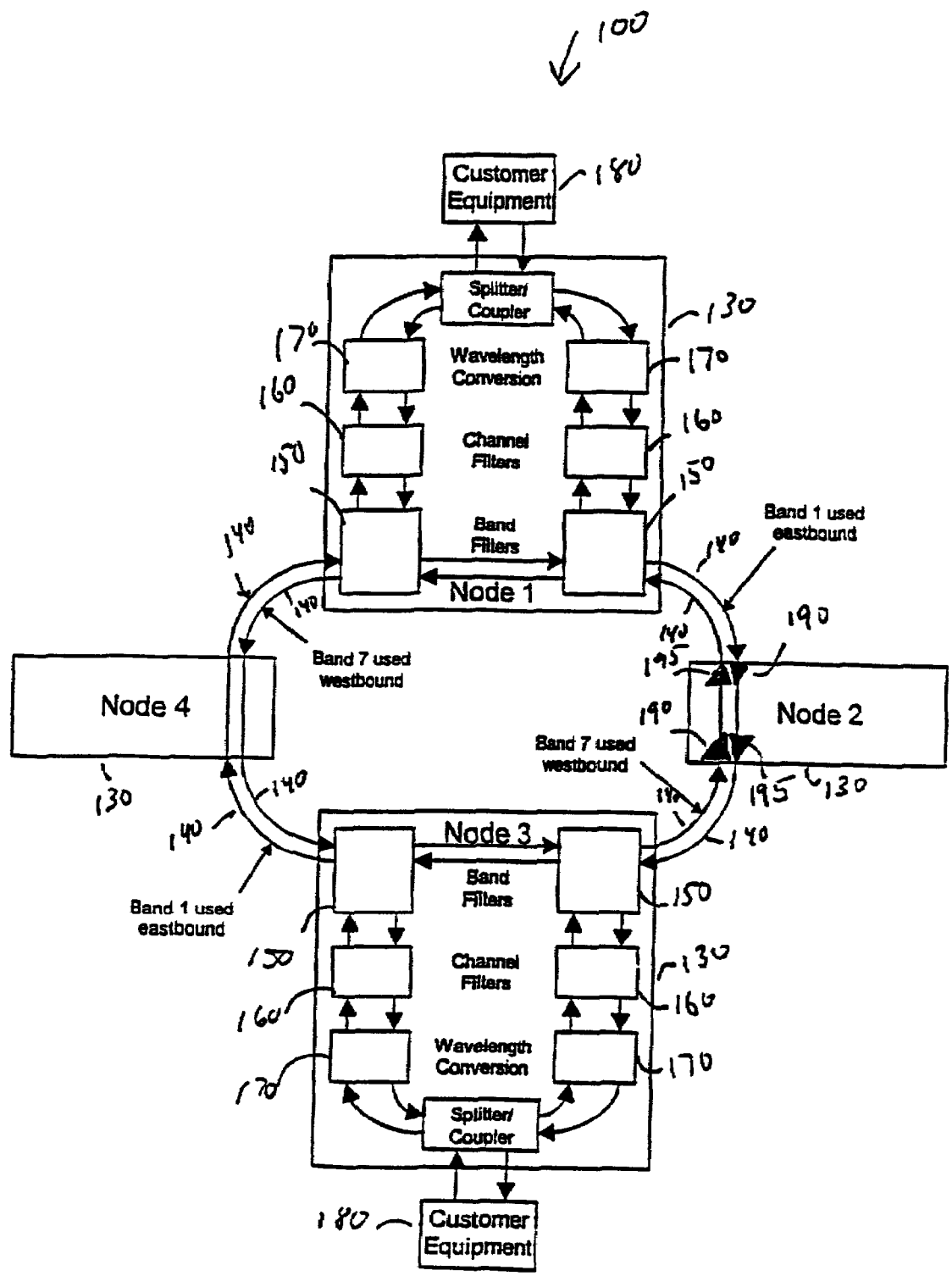
FIG. 1 is a block diagram of a prior art optical network.
Figure 2A:
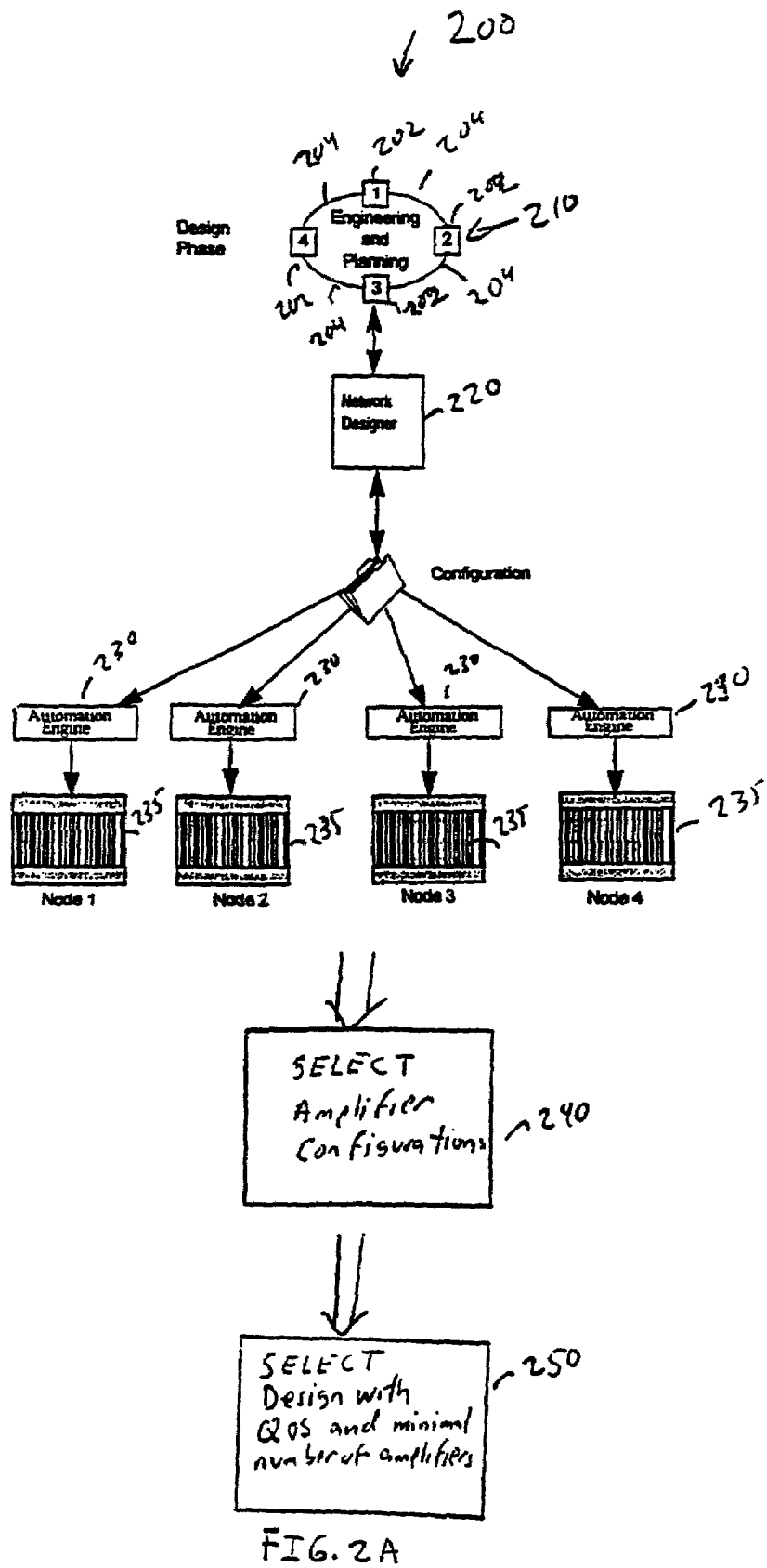
FIG. 2A is a diagram illustrating a method of designing an optical network.

FIG. 2A illustrates a general design procedure 200 for designing a WDM optical network in accord with one embodiment of the present invention. In one embodiment, a network design tool 220 is a computer aided design (CAD) tool used to assist in forming a wavelength channel map for the optical network (i.e., a map of channels added, dropped, and passed through each node for each operational mode of the optical network). A desired service provided from a source node to a destination node typically includes at least one optical wavelength channel having an associated optical path from the source node to the destination node.

A network design tool 220 facilitates the rapid design of an optical network and preferably includes graphical user interfaces and databases configured to facilitate the design process. For example, the network design tool may include a graphical user interface for inputting graphical representations of optical nodes 202, the length and attenuation of optical fiber spans 204 coupling the nodes, network topology information, a list of desired services, and other design information. A design application and database of design rules may be coupled to network design tool 220 to permit the design tool 220 to design a network configuration from information supplied by a user.

In one embodiment, in a design phase 210 an arrangement of optical nodes 202 and optical fiber spans 204 coupling the nodes is selected by a user and input into the design tool 220 using a graphical user interface provided by the design tool 220. The optical loss of the optical fibers 204 is also input. The optical services to be provided between nodes 202 are selected by the user. Examples of services include OC-48 and OC-192 compliant services. In one embodiment, a user may also select the network topology and protection type such as selecting from a unidirectional path switched ring (UP SR), bi-directional line switched ring (BLSR), mesh, or other network type.

Each node performing an optical add, drop, or pass-through function requires a suitable arrangement of optical components to perform its function. The configuration of the optical components of each node may be determined from a channel map of the network. In one embodiment, each WDM node is implemented as a plurality of rack mounted line cards and mux/demux circuit packs. The mux/demux circuit packs are designed to permit them to be optically coupled together with fiber optic pigtails as multi-stage optical add/drop multiplexers for adding, dropping, and passing through channels according to the channel map. In one embodiment, network design tool 220 has software with automation engines 230 for automatically selecting line cards and mux/demux circuit packs 235 for each node consistent with the channel map and desired services. The mux/demux circuit packs may be arranged in a variety of ways to perform an add/drop and pass-through function. For example, in first stage or stages, bands of wavelength channels may be muxed/demuxed while in a second stage or stages, individual wavelength channels may be muxed/demuxed.

In one embodiment, the optical network is initially configured with a preselected number of optical amplifiers in each node (e.g., zero). After each node is configured, a subset of potential optical amplifier configurations 240 is selected using an algorithm to select a set of one or more amplifier placement configurations likely to have acceptable power characteristics. As described below in more detail, one useful criteria is that the amplification be sufficient in one or more portions of the optical network to maintain the power level of a wavelength channel above a threshold power level. In one embodiment after an initial placement of at least one amplifier, a set of amplifier placement configurations is formed by creating permutations of the amplifier configuration which are consistent with the initial amplifier placement (e.g., by varying the amplifier placement in node locations for which an amplifier has not been positively placed or excluded).

The set of optical amplifier placement configurations is preferably small enough in number to facilitate further analysis of the optical network. This facilitates using a quality of service (QOS) algorithm to determine an optical network design having the desired quality of service and a minimal (or near minimal) number of optical amplifiers 250.

Figure 2B:
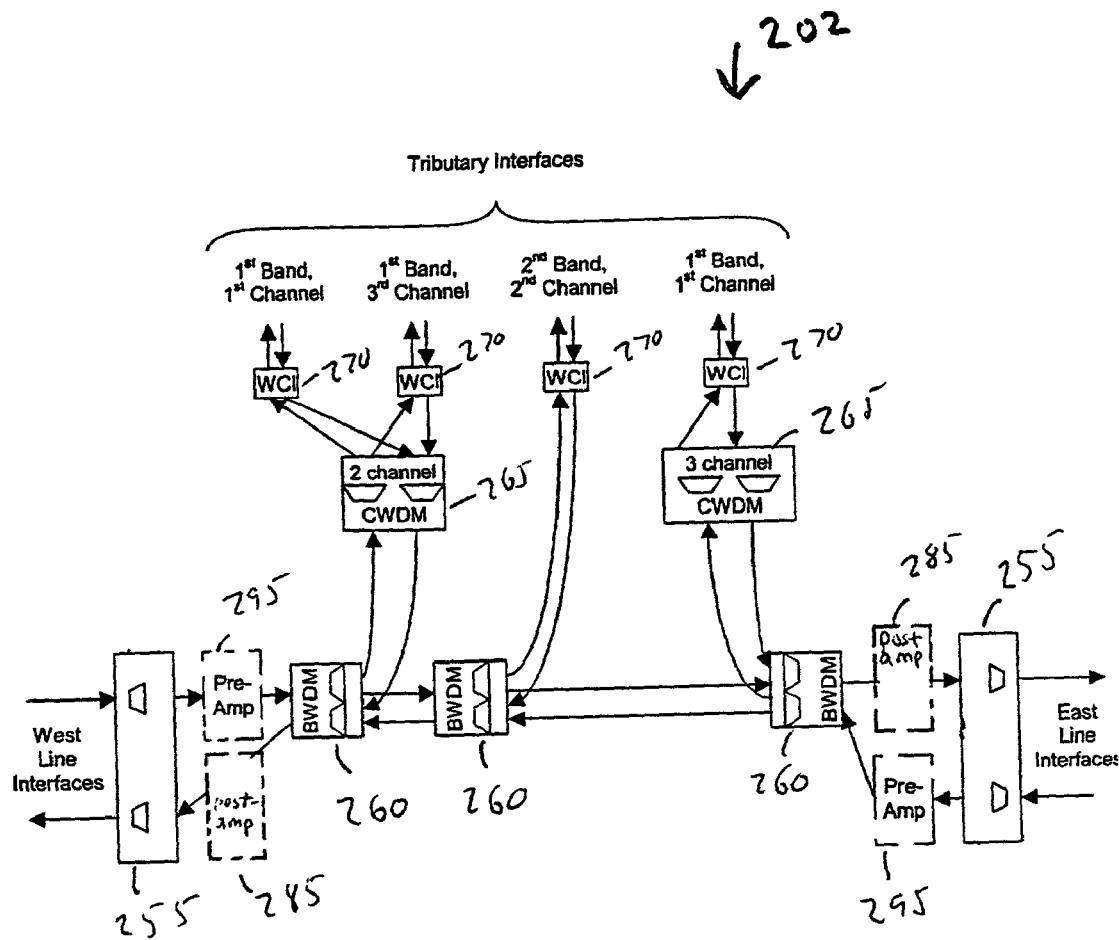
FIG. 2B is a block diagram of an exemplary node designed by the design tool of FIG. 2A.

FIG. 2B is a block diagram of an exemplary node with some conventional components omitted for clarity, although it will be understood that the present invention is applicable to a variety of different node designs. As indicated in FIG. 2B, after configuration of the line cards and mux/demux circuit packs, each node 235 may comprise line cards 255 having input and output ports for coupling wavelength channels with optical fibers, an arrangement of band wavelength division multiplexers (BWDM) circuit packs 260 for selecting bands of wavelengths (i.e., two or more closely spaced wavelength channels), channel wavelength division multiplexers (CWDM) circuit packs 265 for selecting individual wavelength channels from a wavelength band, and transceivers or wavelength converter interfaces (WCI) 270 for coupling signals to tributary interfaces. The assignment of channels that are to be added, dropped, and passed through the node may be used in conjunction with knowledge of the characteristics of BWDM 2600 and CWDM 265 circuit packs to select a configuration of BWDM 260 and CWDM 265 circuit packs.

As indicated in FIG. 2B, in one embodiment, each input fiber may have a preamplifier 295 (shown in phantom since it is an optional component) coupled to amplify incoming wavelength channels from an input fiber. Each output fiber may have an associated post-amplifier 285 (shown in phantom since it is an optional component) coupled to amplify output wavelength channels.

In an optical network with variable span loss, the selection of the minimal total number of optical amplifiers in the optical network and their placement in each node cannot be determined from the channel map alone. This is because the optical amplifier placement configuration affects the received power and noise level throughout the optical network. Moreover, for high data rate optical networks (e.g., OC-48 and OC-192) the injected noise from each optical amplifier and the non-linear effects associated with the amplifiers and fibers determines the quality of service (QOS), e.g., affects the optical signal-to-noise ratio and therefore the bit error rate.

Figure 3:
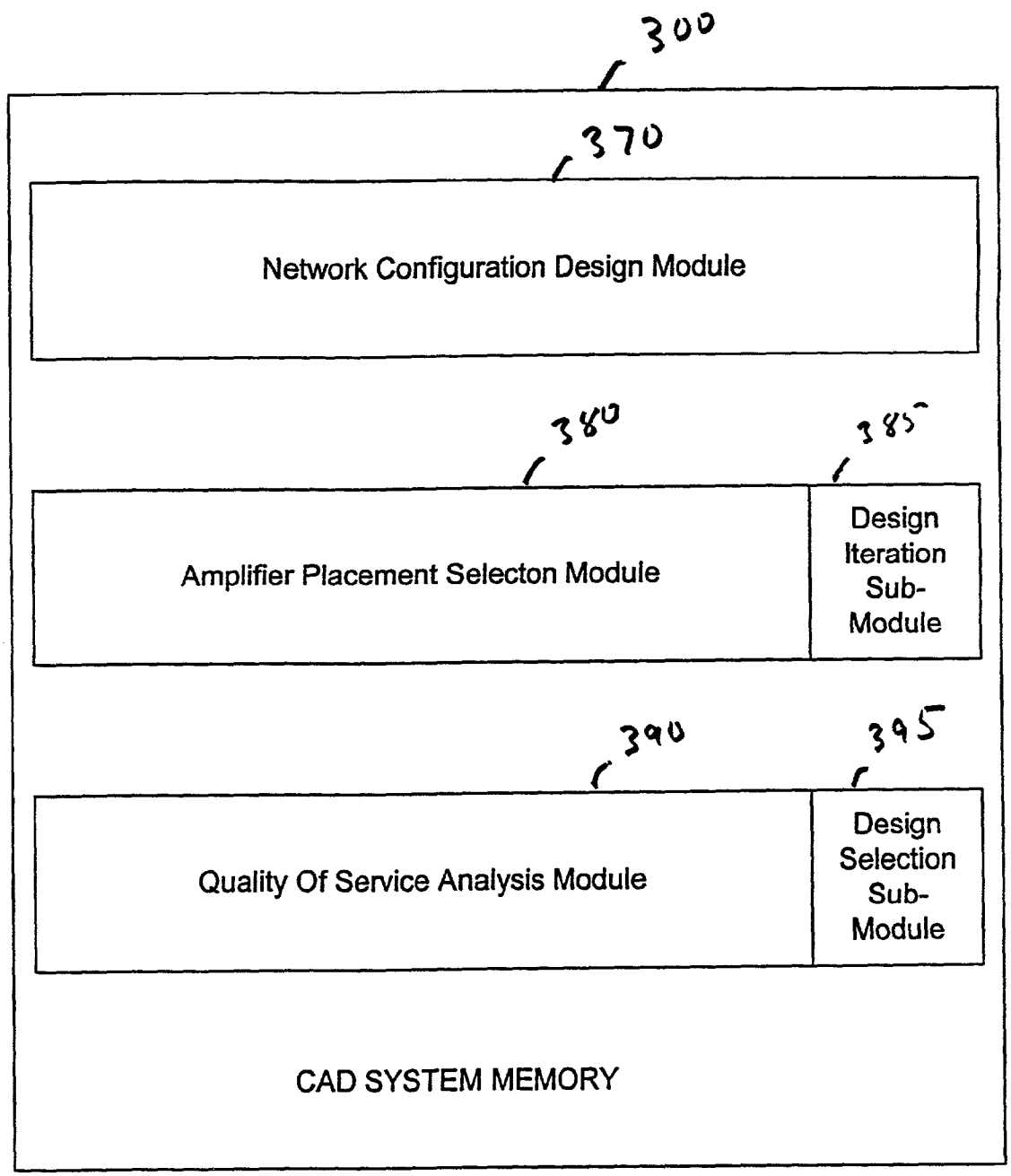
FIG. 3 shows principal software modules of a computer aided design tool.

FIG. 3 is a generalized block diagram of one embodiment of a computer aided design tool 300 for designing an optical network in accord with the present invention. The design tool may be implemented as software modules residing in the memory of a design workstation or other computer and programmed in a suitable software language, such as the JAVA language. However, it will also be understood that some or all of the software modules of the design tool may be stored on a computer readable medium, such as a compact disk (CD), be accessible from a network server, or be hosted on a server coupled to the Internet.

In one embodiment of a design tool 300, a network configuration design module 370 selects a configuration of the optical components in each node to be suitable to transport wavelength channels for providing desired optical services between nodes of the optical network. An amplifier selection set module 380 selects a subset of all possible amplifier arrangements for a particular network configuration. A design iteration sub-module 385 may include rules for forming design iterations about an initial amplifier placement configuration.

In one embodiment, the subset of amplifier placements may then be analyzed in a quality of service analysis module 390, such as a module performing an analysis of the optical path from an optical transmitter to a receiver. For example, it may perform a detailed power analysis of the optical power level of every channel in every node of the configured optical network. This may also include power balancing of channels. An example of a power analysis method to validate network performance is described in U.S. Pat. No. 6,304,347, by Beine, et al., entitled "Optical Power Management In An Optical Network," commonly owned by the assignee of the present invention, the contents of which are hereby incorporated by reference in the present patent application. It will be understood, however, that other suitable quality of service analysis applications may be utilized, such as an application which calculates bit error rates, optical signal to noise ratio, or other indicia of the QOS. In one embodiment the quality of service analysis module 390 includes a design selection sub-module 395 that selects the optical network design having a desired quality of service and a minimum number of optical amplifiers.

For a network with a total of n nodes, where n is an integer, and having a preamplifier for each of two input fibers and a post-amplifier for each of two output fibers, the total number of amplifier placement configurations is $2^{4n}$. At each node the decision tree branches out 16 fold (since the four amplifier locations may be filled in $2^4$ different ways). After even a small number of nodes the decision tree will branch out into an enormous number of possible optical amplifier placement configurations. Amplifier placement selection module 380 may use one or more algorithms for eliminating optical amplifier configurations unlikely to have acceptable optical power characteristics and/or to imposing constraints that have the effect of limiting the total number of amplifier placement configurations.

Figure 4A:
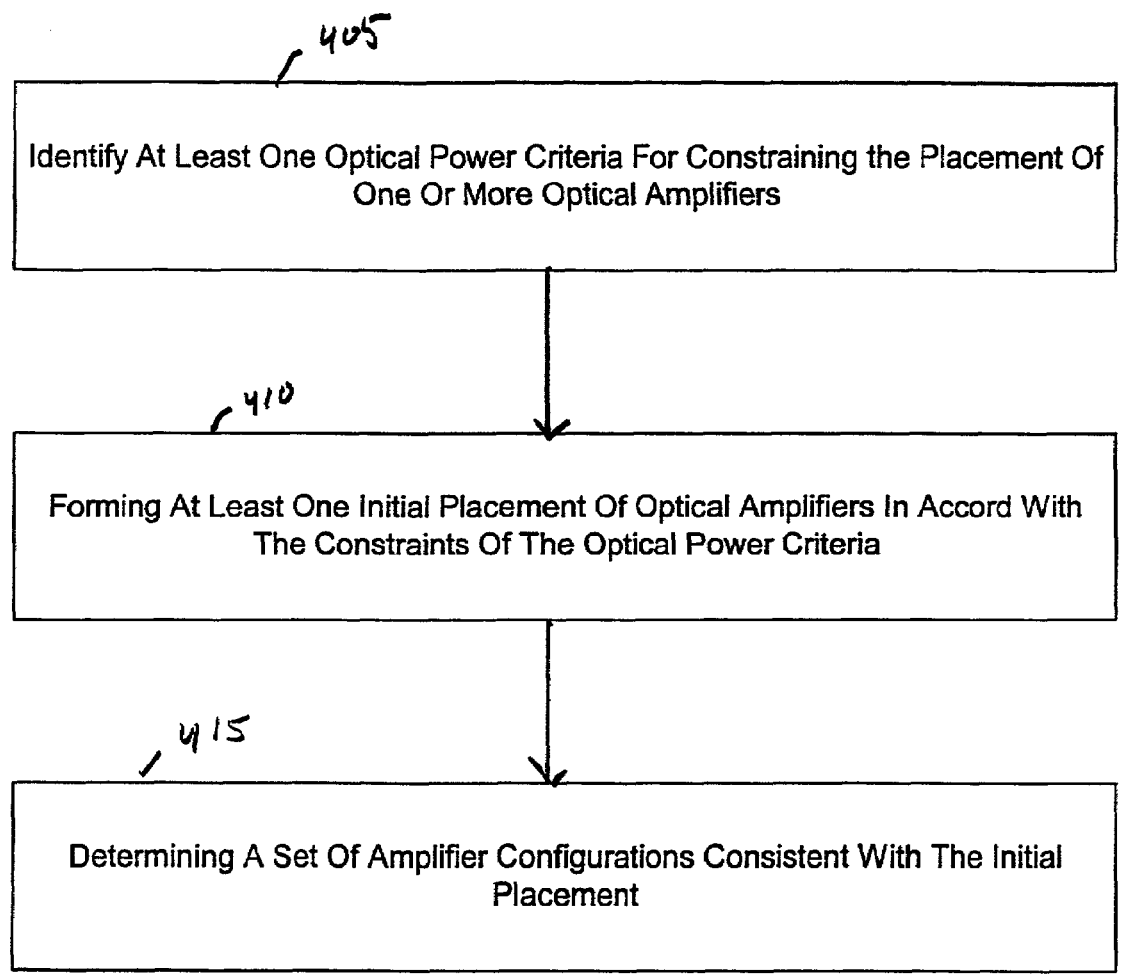
FIG. 4A is a flow chart of one method of selecting a set of amplifier configurations.

FIG. 4A is a flow chart illustrating one embodiment of a generalized amplifier placement selection method. At least one optical power criterion is identified 405 that places a constraint on the placement of one or more optical amplifiers in the optical network. An initial placement or placements of optical amplifiers 410 is formed in accord with the constraints. A set of amplifier placement configurations is then determined 415 which are consistent with the initial amplifier placement(s).

A variety of different algorithms may be used as criterion to impose constraints on amplifier placements that reduce the search space. As an illustrative example, the optical power criterion may be a test or condition related to one or more receivers receiving a minimum detected power level. In particular, the arrangement of optical amplifiers along an optical path (lightpath from a transmitter in a source add node to a receiver in a destination drop node) needs to provide sufficient optical amplification to achieve a minimum power level in one or more receivers. For example, the criterion may identify node locations along an optical path requiring one or more optical amplifiers for the optical path to satisfy an optical power condition, such as a minimum optical power level at a receiver.

Figure 4B:
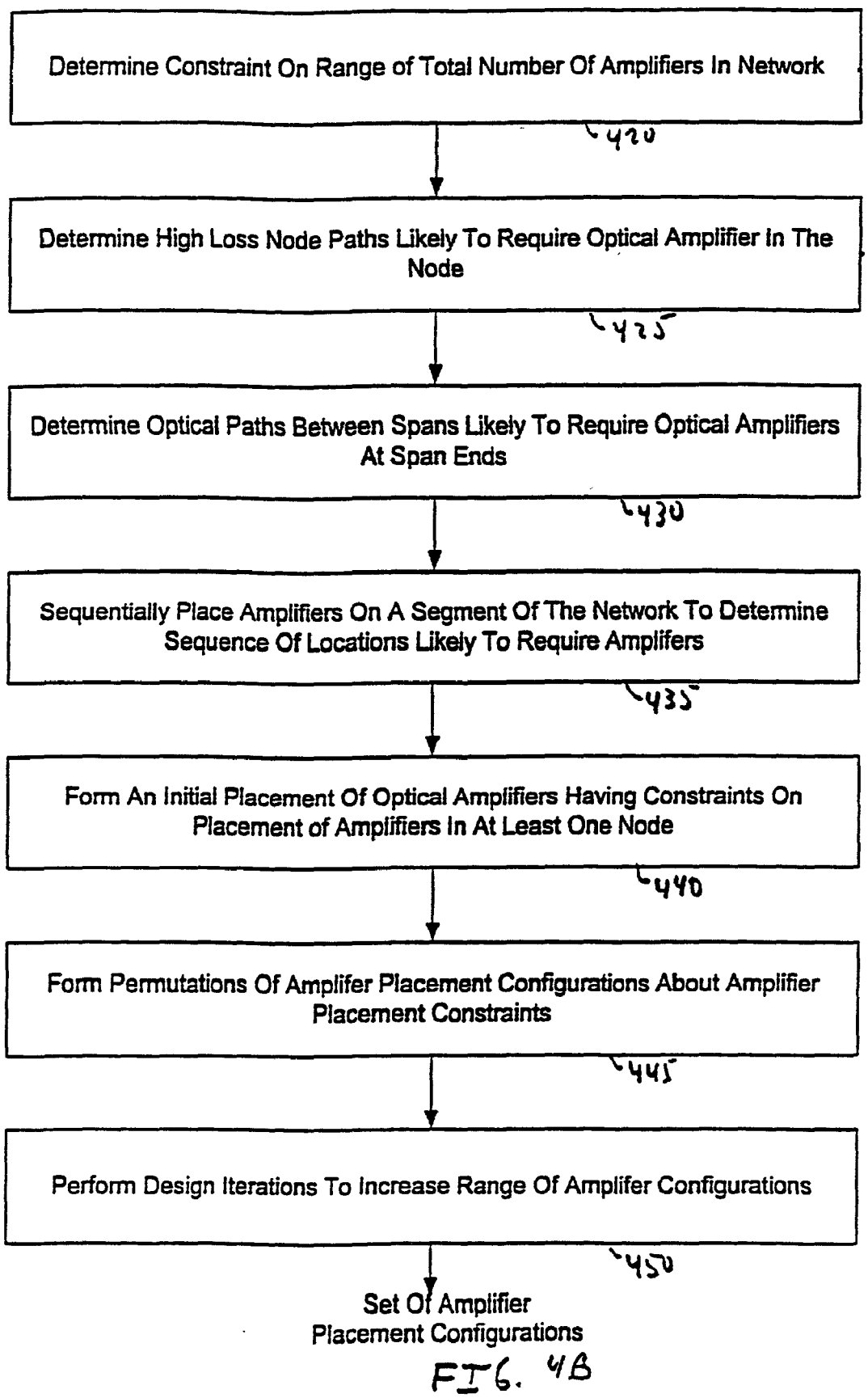
FIG. 4B is a flow chart showing another method of selecting a set of amplifier configurations.

FIG. 4B is a flow chart showing several different algorithms that may be used alone or in combination to reduce the search space. The total number of amplifiers in a network may be constrained 420 by forming an estimated range of the total number of amplifiers from an analysis of the aggregate losses of the network. High loss paths internal to individual nodes 425 may be used to determine nodes requiring optical amplifiers. Path losses along the add/drop path between nodes may be used to determine 430 the location of optical amplifiers at the ends of the span coupling the nodes. Amplifiers may also be placed sequentially at the first place along a segment of an optical path requiring amplification 435, with the sequence of operations arranged to amplifier placement.

An initial placement of optical amplifiers is formed 440 in accord with the constraints of the selection algorithm or algorithms utilized. However, in some cases there may be some amplifier placement decisions that are still unconstrained or only partially constrained. Consequently, permutations of the unconstrained amplifier placement locations may be performed to form a set of amplifier placement configurations. In one embodiment, design iterations 450 are performed about the initial amplifier placement to increase the range of amplifier configurations.

Illustrative examples of algorithms for forming constraints on the initial placement of amplifiers are described below in more detail.

Node Loss Algorithm

A node with a high optical loss for one or more optical channels is likely to require additional optical amplification so that optical wavelength channels passing through the node reach a subsequent node with a sufficiently high optical power level. Consequently, in one embodiment, a heuristic node-based algorithm determines if the node has an internal node loss for one or more channels that is sufficiently high that one or more optical amplifiers are required to compensate for the high node losses.

Figure 5A:
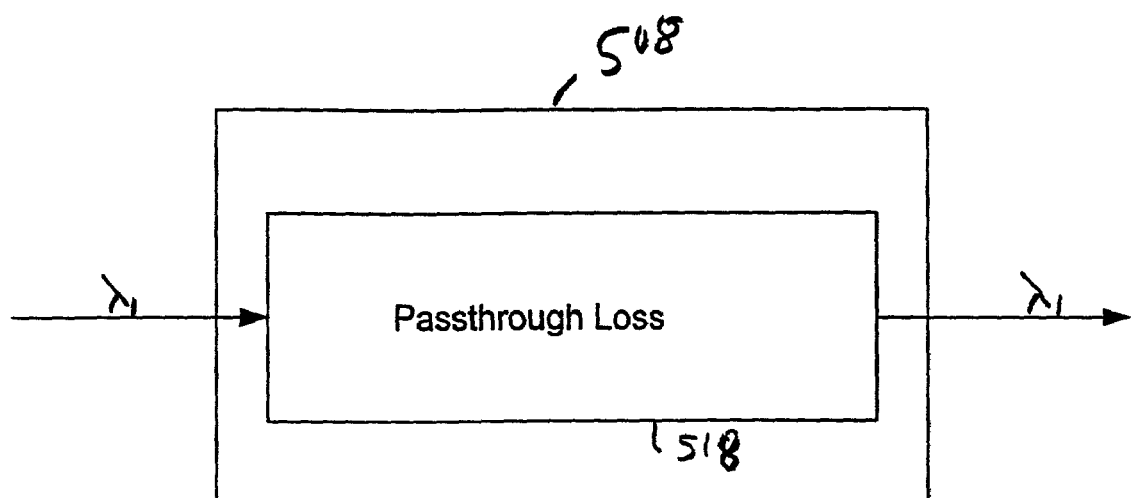
FIG. 5A is a block diagram showing an equivalent optical circuit for a pass-through channel.

FIG. 5A is a block diagram showing an equivalent optical circuit of a node 508 for a pass-through channel or band of channels. For a pass-through channel the affects of intervening mux/demux and line components may be modeled as an equivalent optical loss 518. Referring to FIG. 5A, for each channel or band of channels passing through an optical node 500 from an input port to an output port there is an equivalent optical loss, $\alpha$. The optical loss for the pass-through channel or band of channels will depend upon the configuration of the mux/demux circuit packs utilized. Similarly, a BLSR node in a protection switch mode, there will be an optical loss associated with redirected traffic from the input port to the output port.

A high node loss reduces the optical signal strength of pass-through channels and makes it unlikely that the channels can be dropped or passed through at a subsequent node with an acceptable QOS. Consequently, if the optical loss in the node exceeds a first threshold level, then at least one optical amplifier may be required to compensate for the high optical loss. The threshold optical loss level may be determined empirically, semi-empirically, or adjusted heuristically. For example, the threshold loss, $\alpha_{th}$, is preferably selected such that the pass-through channels each have power levels exceeding $P_1$ where $P_1$ is a threshold power level for pass-through channels leaving the output port of the nodes. The threshold loss level can also be selected using empirical techniques.

Figure 5B:
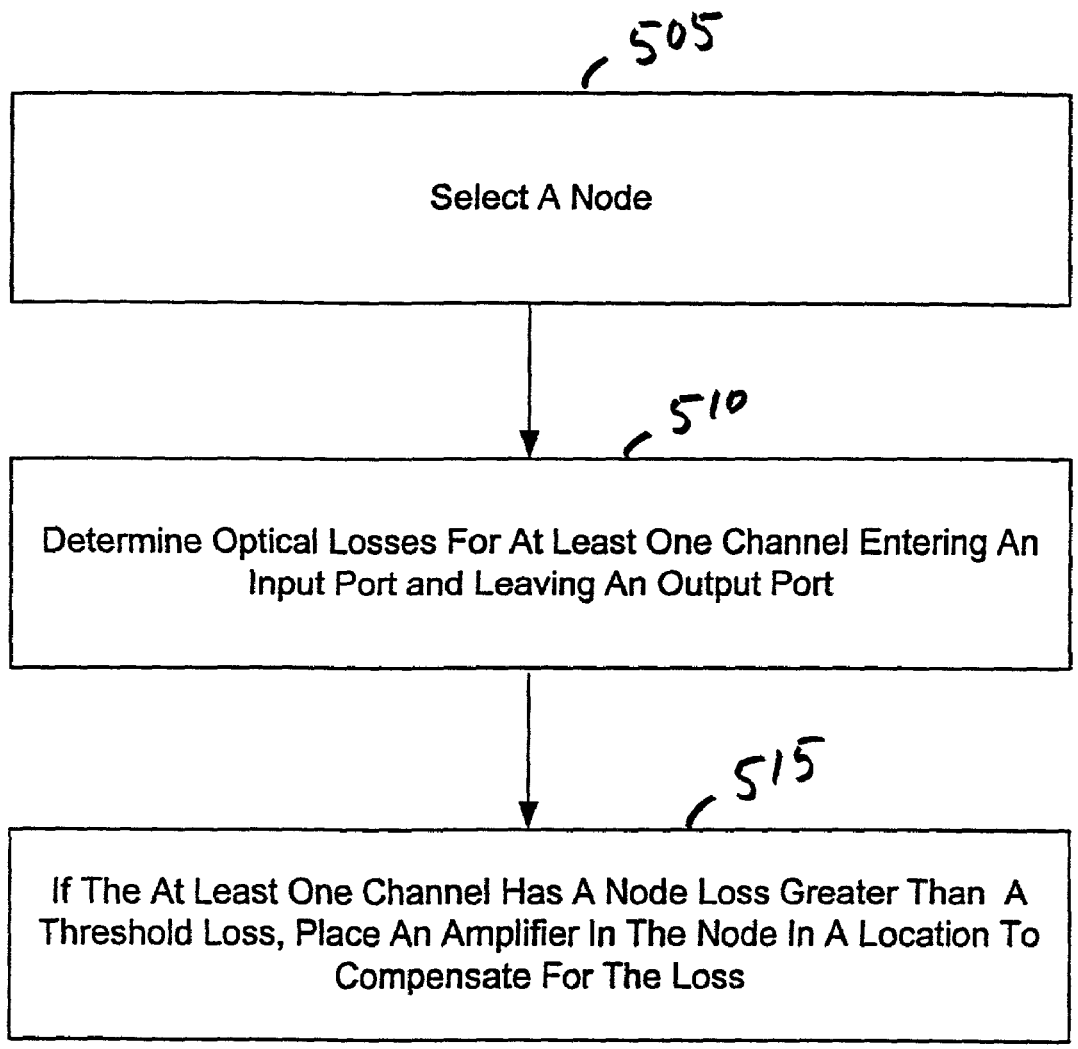
FIG. 5B is a flow chart of a node algorithm for selecting amplifier placement.

Referring to the flow chart of FIG. 5B, in one embodiment a node is selected 505. The node algorithm then analyzes 510 the optical loss for optical channels passing through the node from an input port to an output port of the node. If a channel or band of channels has an optical loss greater than a threshold loss, the algorithm selects a sufficient number of optical amplifiers to compensate for the loss of the node. In one embodiment, the algorithm determines if a channel or band of channels experiences a high absorption loss in its optical path through the node and adds an appropriate number of amplifiers in the optical path within the node (e.g., a post-amplifier) to compensate for the high losses of the node.

As previously discussed, if circuit packs are used to implement the optical add/drop multiplexer of each node, a configuration of line cards, BWDM circuit packs, and CWDM circuit packs to implement the add/drop multiplexer function may be determined in a design phase based upon a channel map intended to implement desired services. Each circuit pack, such as a line card, BWDM circuit pack, or CWDM circuit pack, has an associated optical loss. This may result in the optical path of some optical wavelength channels or bands of channels having comparatively high losses.

Figure 6:
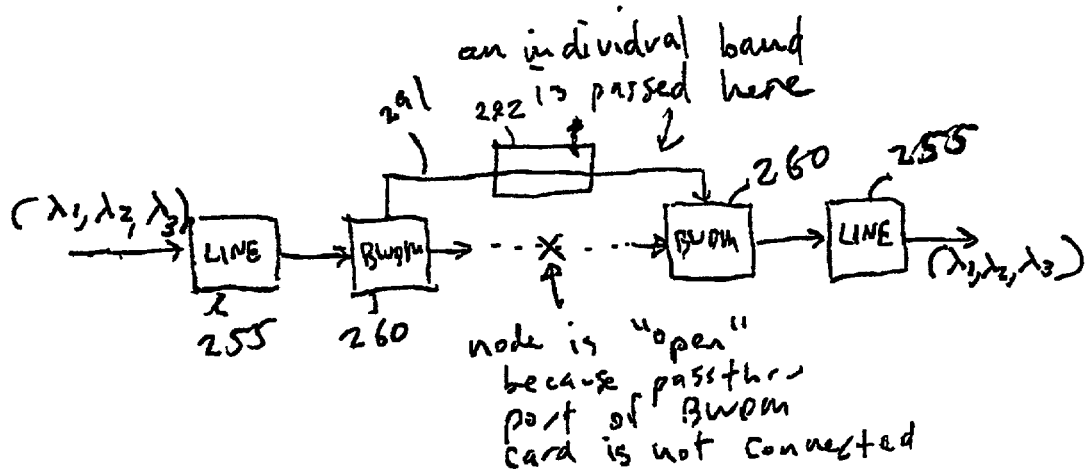
FIG. 6 is a block diagram illustrating a band-pass through node having high band losses.

FIG. 6 is a block diagram of a node having BWDM circuit packs 260 arranged for band-pass-through. In a band-pass through configuration, the pass-through band has to travel through two line cards 255, at least two BWDM circuit packs 260, and an extra coupling path 291 that may contain other components 292, resulting in high band losses for the passed through band. In one embodiment, the algorithm identifies band-pass-through nodes with high losses and assigns an optical amplifier, such as a post-amplifier, to compensate for the increased band-pass losses. A pad (attenuator) may be placed prior to the post-amp to prevent optical amplifier saturation.

Figure 7:
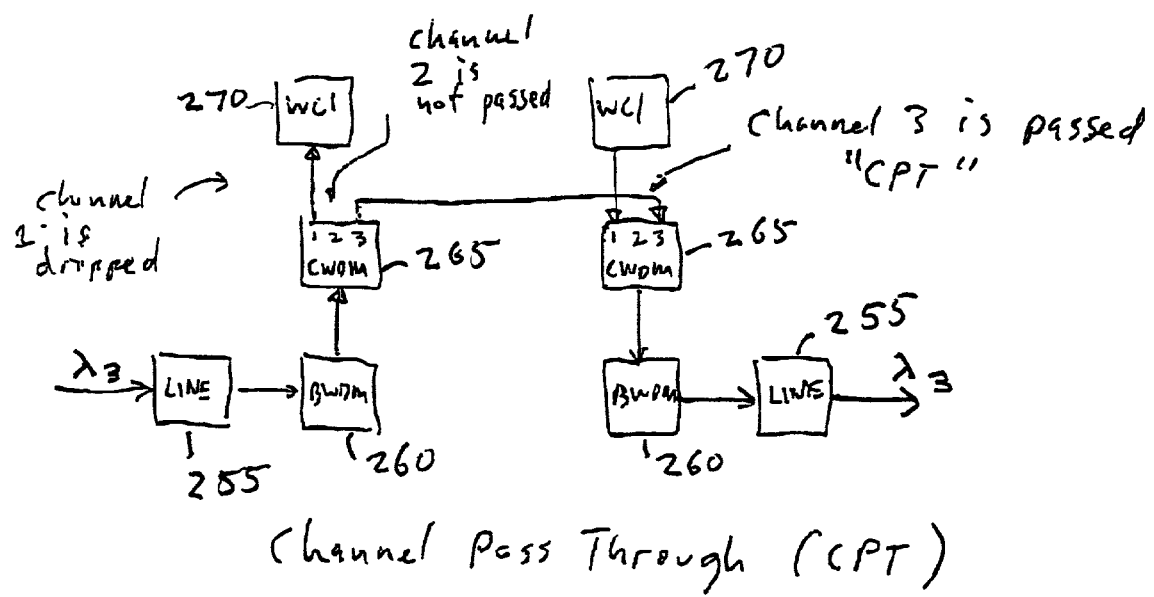
FIG. 7 is a block diagram illustrating a channel pass-through node having high channel losses.

FIG. 7 is a block diagram of a node having BWDM circuit packs 260 and CWDM circuit packs 265 configured for channel pass-through. In a channel pass-through configuration, wavelength channels that enter the node are de-multiplexed in the node to the channel level, re-multiplexed, and passed on to other nodes. This requires the pass-through channel to experience the optical losses associated with at least two line cards, two BWDM circuit packs and two CWDM circuit packs. In one embodiment, a post-amplifier is selected for a node having a channel pass-through loss exceeding a threshold loss. A pad (attenuator) may be placed prior to the post-amp to prevent optical amplifier saturation.

In another embodiment, a node algorithm determines if the node performs a ring switch or line switch function in a protection mode that would result in high losses in the protection mode requiring additional amplification. For example, in BLSR networks a line failure (e.g., a break in a fiber) subsequent to a node may result in each pass-through optical channel being redirected back through the node to the previous node. The BLSR protection mode requires sufficient gain to compensate for the internal losses of the BLSR switching elements in the node, any additional BWDM required for the BLSR switching, and the losses associated with the fiber back to the previous node. Consequently a BLSR node may require one or more optical amplifiers by virtue of the increased node and path losses associated with the protection state of the node.

The node loss algorithm may be combined with other algorithms described below. In one embodiment, the node loss algorithm is utilized first. In some cases, such as a network having a small number of nodes, the node loss algorithm may sufficiently reduce the search space to permit detailed analysis of all remaining amplifier configurations consistent with the constraint of the amplifiers placed by the node loss algorithm. More typically, however, the node loss algorithm may be combined with one or more of the other algorithms described below.

Span Loss Algorithm

Figure 8:
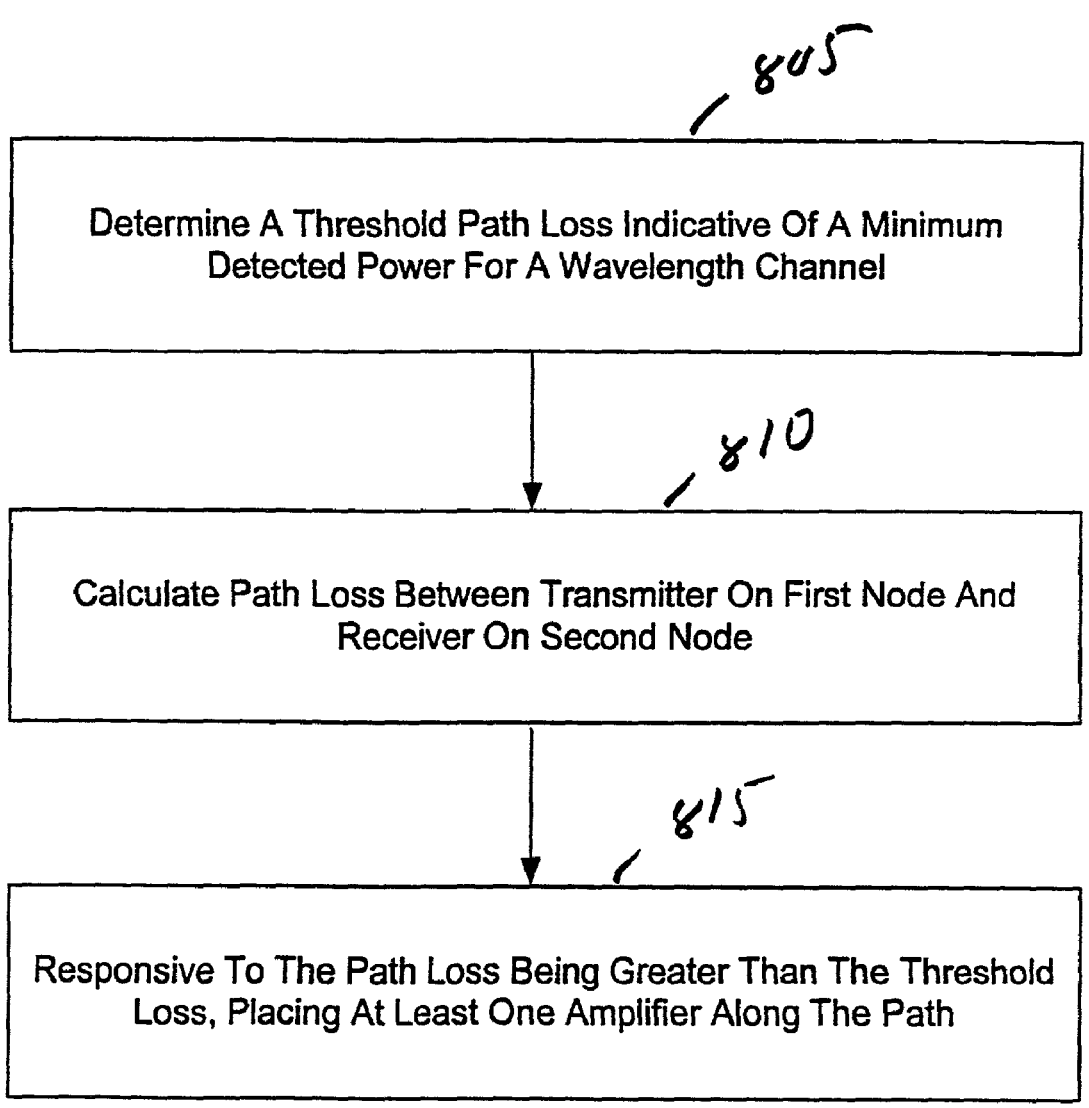
FIG. 8 is a flow chart of a span algorithm for selecting amplifier placement.

An added channel generated by a transmitter within a node has an initial signal power level. In order for the channel to be detected at a receiver in another node, the power must exceed a threshold power level. Consequently, an optical amplifier is likely to be required if the effective loss between the transmitter generating a wavelength channel on one node and a receiver detecting the wavelength channel on another node exceeds a threshold loss level. As shown in the flow chart of FIG. 8, in one embodiment a threshold loss is determined 805 above which a receiver power is likely to be below a minimum detected power level. The path losses are calculated 810 for an optical wavelength channel generated at a transmitter at one node and received in a receiver of an adjacent node. If the path loss exceeds a threshold path loss, at least one optical amplifier is added along the path 815.

Figure 9:
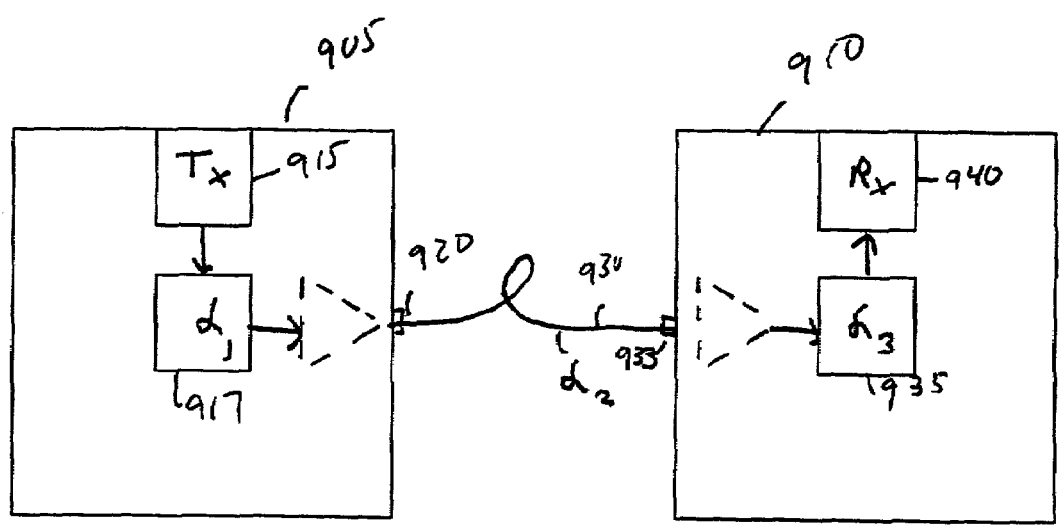
FIG. 9 is a block diagram showing equivalent optical losses for an add/drop channel coupled between two adjacent nodes.

Referring to FIG. 9, for two adjacent nodes, 905 and 910 the equivalent loss $\alpha_1$, 917 of the first node 905 from the transmitter 915 to an output port 920 may be calculated (e.g., by analyzing the loss associated with circuit packs and line cards within the node). The span loss $\alpha_2$ may be calculated from the length and type of the optical fiber 930 coupling the nodes. The equivalent loss, $\alpha_3$, 935 of the second node 910 from an input port 933 to the receiver 940 may be calculated. If the total loss, $\alpha_{tot} = \alpha_1 + \alpha_2 + \alpha_3$, exceeds a first threshold, then at least one amplifier is likely to be required along the path from the transmitter to the receiver. If the total loss exceeds a second threshold, then at least two amplifiers are likely to be required along the path from the transmitter to the receiver. The equivalent losses, $\alpha_1$ and $\alpha_3$, may be calculated from the fixed losses associated with the line cards in each node, the loss associated with add/drop multiplexers in each node, and any other optical components (e.g., ring switch modules and wavelength protection switches). An optical amplifier saturation penalty may be included to account for the effects of a large number of bands in decreasing the maximum power per channel.

Figure 10:
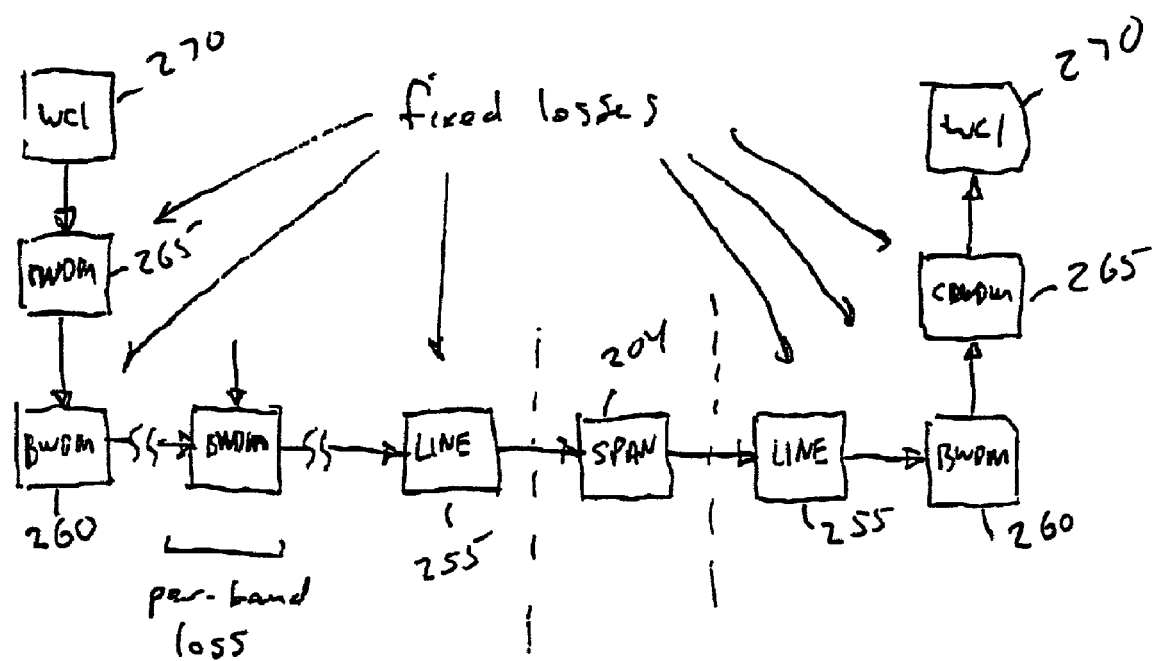
FIG. 10 is a block diagram of a modular node design and the components giving rise to optical losses between two spans.

FIG. 10 shows an illustrative example of the losses associated with transmitting a wavelength channel from a first node to a receiver in a second node for a UPSR networks. In the example of FIG. 10 the each node includes WCI, CWDM, and BWDM circuit packs along with line cards. To send a signal between two adjacent nodes, the path loss has to be less than a threshold loss so that receiver power is within an acceptable margin. If the path loss is greater than the threshold loss, an amplifier is required. A simplified formula for the path loss is:

Path loss=per-band-loss*bands+span-loss+fixed-loss

Where the per-band loss is the additional loss caused by each band (derived from the bandcard pass-loss and the amp saturation penalty), the span loss is the loss of the span coupling the nodes, and the fixed-node element-loss includes the two linecards (optical elements coupling the optical signal into the node) and the loss in the CWDM (optical elements coupling individual WDM optical channels) on each end.

The fixed losses may be calculated from the losses associated with each circuit pack along the path. For an exemplary network shown in FIG. 9, each BWDM circuit pack has a loss of about 1.4 dB, a CWDM circuit pack for adding an optical channel has a loss of 3.3 dB, a CWDM circuit pack for dropping the optical channel has a loss of 2.3 dB, an input line card has a loss of 2.0 dB, and an output line card has a loss of 0.8 dB, corresponding to a fixed loss of 11.2 dB, as described below in Table I:

TABLE I table of fixed losses for the nodes of FIG. 10.

| | |
|---|---|
| CWDM add | 3.3 |
| CWDM drop | 2.3 |
| BWDM add | 1.4 |
| BWDM drop | 1.4 |
| LC ingress | 2.0 |
| LC egress | 0.8 |
| total | 11.2 |

Note that the 11.2 dB for this example does not include the span loss. As an illustrative example, the per-band-loss may be estimated at 1.5 dB per span (one BWDM circuit pack add-thru at 0.8 dB plus a linear approximation of the saturation penalty).

In one embodiment, if the path loss exceeds 25 dB, the algorithm places a post-amp on either end of the span. If the loss exceeds 50 dB, preamps are also added. In this example, these numbers provide a reasonable threshold criteria numbers were chosen because 25 dB is roughly the difference between the WCI transmit and minimum-receiver power; and 25 dB is the maximum amplifier gain in one embodiment.

The span loss algorithm, alone or in combination with the node loss algorithm, may be sufficient to substantially reduce the initial search space. In some cases the span loss algorithm may result in slightly more amplifiers being selected than necessary. Consequently, in one embodiment the path loss threshold is increased by a sufficient margin to reduce, somewhat, the number of amplifiers that it places in order to broaden the set of amplifier placement configurations to include configurations that have fewer optical amplifiers.

It will be understood that span loss algorithm may be adapted for a network having pre-placed optical amplifiers by adjusting the rule to decrease the number of amplifiers if the total loss is less than a threshold loss.

Path Loss Algorithm

Figure 11:
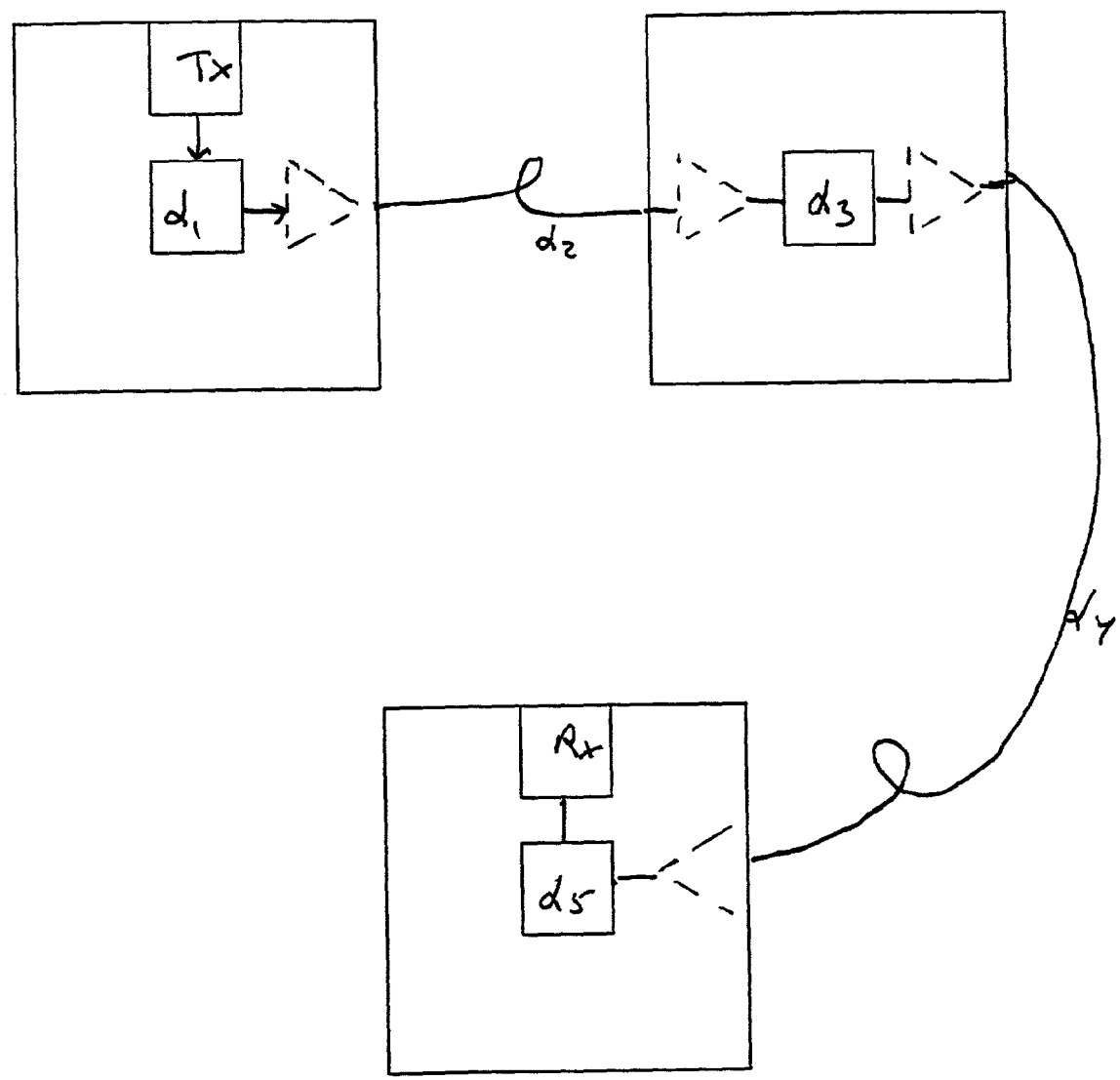
FIG. 11 is a block diagram illustrating a method of sequentially examining loss along an optical path.

The span loss algorithm may be extended to include non-adjacent nodes. As indicated in FIG. 11, in one embodiment, an optical wavelength channel added at a first node may be modeled as traversing an optical loss in the first node, an optical loss in a destination drop node, and all of the span losses and pass-through losses of every intermediate node. In one embodiment, a starting node is selected in which a wavelength channel is added. An optical amplifier may be added at the first location from the adding node to the receiving node having a cumulative effective optical loss for the channel exceeding a threshold level. The first optical amplifier of the design is then set. The path loss of a subsequent channel may then be analyzed along the path of that channel. This may be continued until a placement of optical amplifiers is selected in which every added channel has sufficient optical gain to traverse the optical path through the nodes to its drop point.

Aggregate Loss Algorithm

Figure 12A:
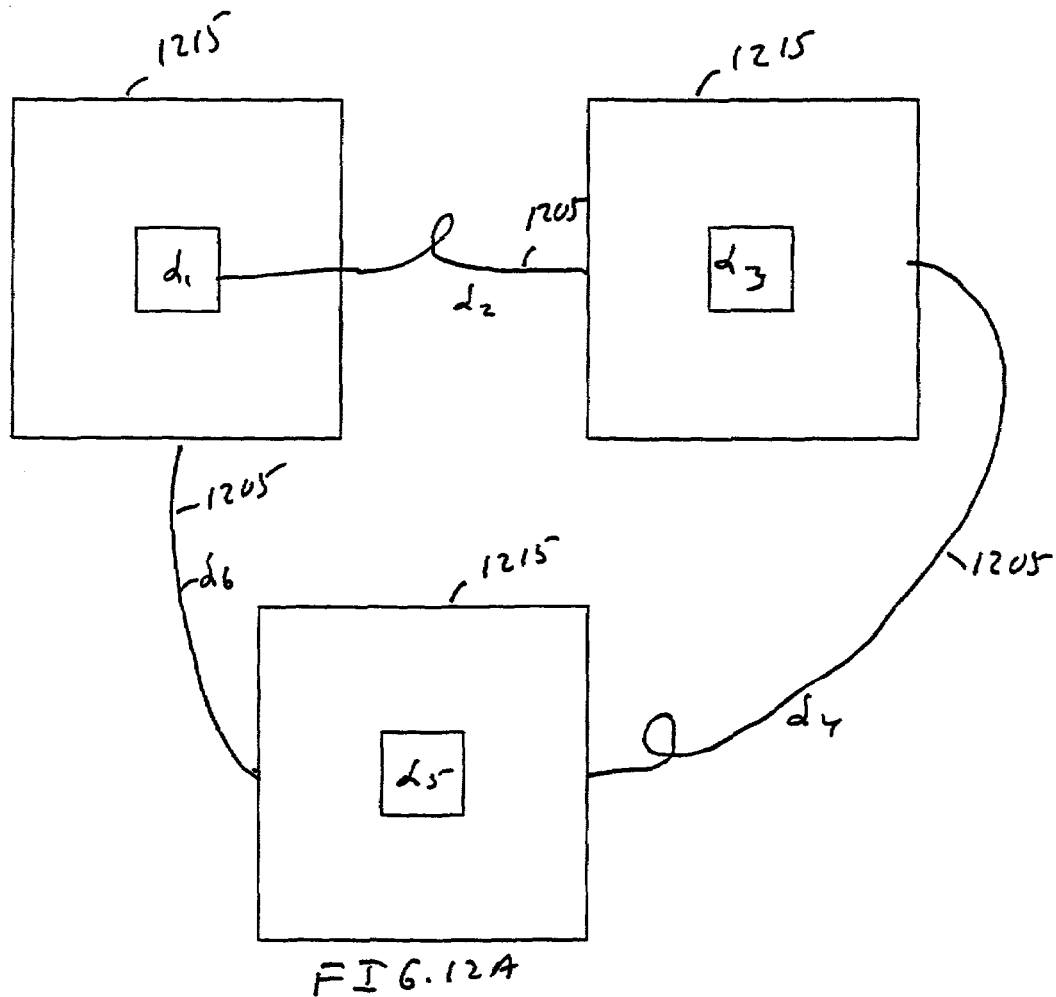
FIG. 12A is a block diagram of an optical network and FIG. 12B illustrates an equivalent aggregate span and band loss for estimating the number of amplifiers required in the network.
Figure 12B:
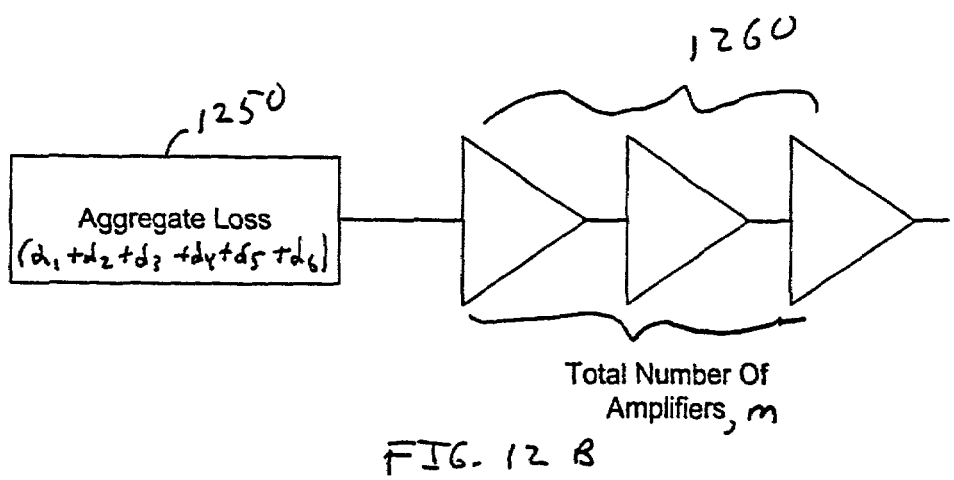

Referring to FIG. 12A, in an optical network each span 1205 has its own span loss and each node 1215 has its own band loss. As indicated in FIG. 12B, in one embodiment all of the span losses and band losses of the nodes are combined to form an aggregate loss 1250. The aggregate loss can then be used to determine an estimate of the number of amplifiers, m, in an aggregate amplifier chain 1260 required to compensate for the aggregate losses 1250.

The aggregate span and band loss may be used to calculate an approximation of the integer number, m, of optical amplifiers required to compensate for the aggregate losses in the optical network. An empirical range factor may be assigned to the approximation to leave a margin of error to account for the variance in span and node loss in the actual network. For example, an initial approximation of m total amplifiers, where m is an integer, may be modified to m±k, where k is a small integer (e.g., 1). The initial estimate of the total number of amplifiers required may be used to limit the initial search space.

As an illustrative example, suppose an optical network has ten nodes and a maximum of 2 preamps and 2 postamps for each node, or a maximum of 40 amplifiers. The aggregate loss may be used to calculate an estimate of the total number of amplifiers required in the network to compensate for the aggregate loss. Suppose, for example, that an aggregate loss analysis indicates that about ten amplifiers are required in the network. In one embodiment, the estimate of the number of amplifiers from the aggregate loss calculation is bracketed by an empirical fudge factor to account for variations in span and node loss, for example, 10±1. This initial estimate eliminates many potential amplifier placement configurations and may be used in conjunction with any of the above-describe algorithms.

Sequential Path Search Algorithm

Figure 13A:
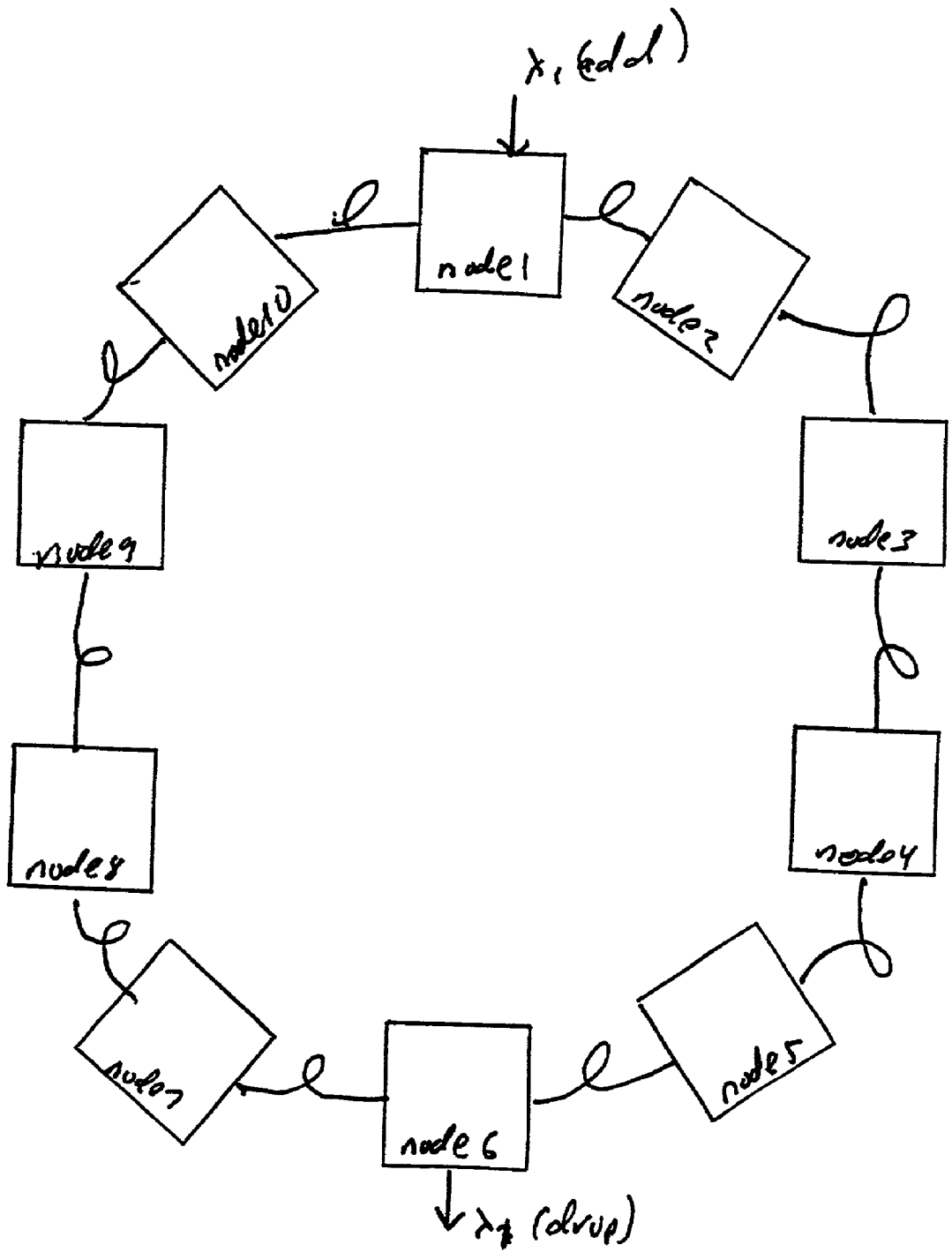
FIG. 13A is a block diagram of an exemplary optical network

In one embodiment, an analytical method is used to calculate power characteristics along one or more optical paths. Referring to the block diagram of FIG. 13A, an optical network has a plurality of nodes. The power characteristics of individual wavelength channels may be analyzed from their add point to their drop point using a variety of analysis techniques. For example, the power level, OSNR, or other power characteristic may be analyzed using a computer model.

Figure 13B:
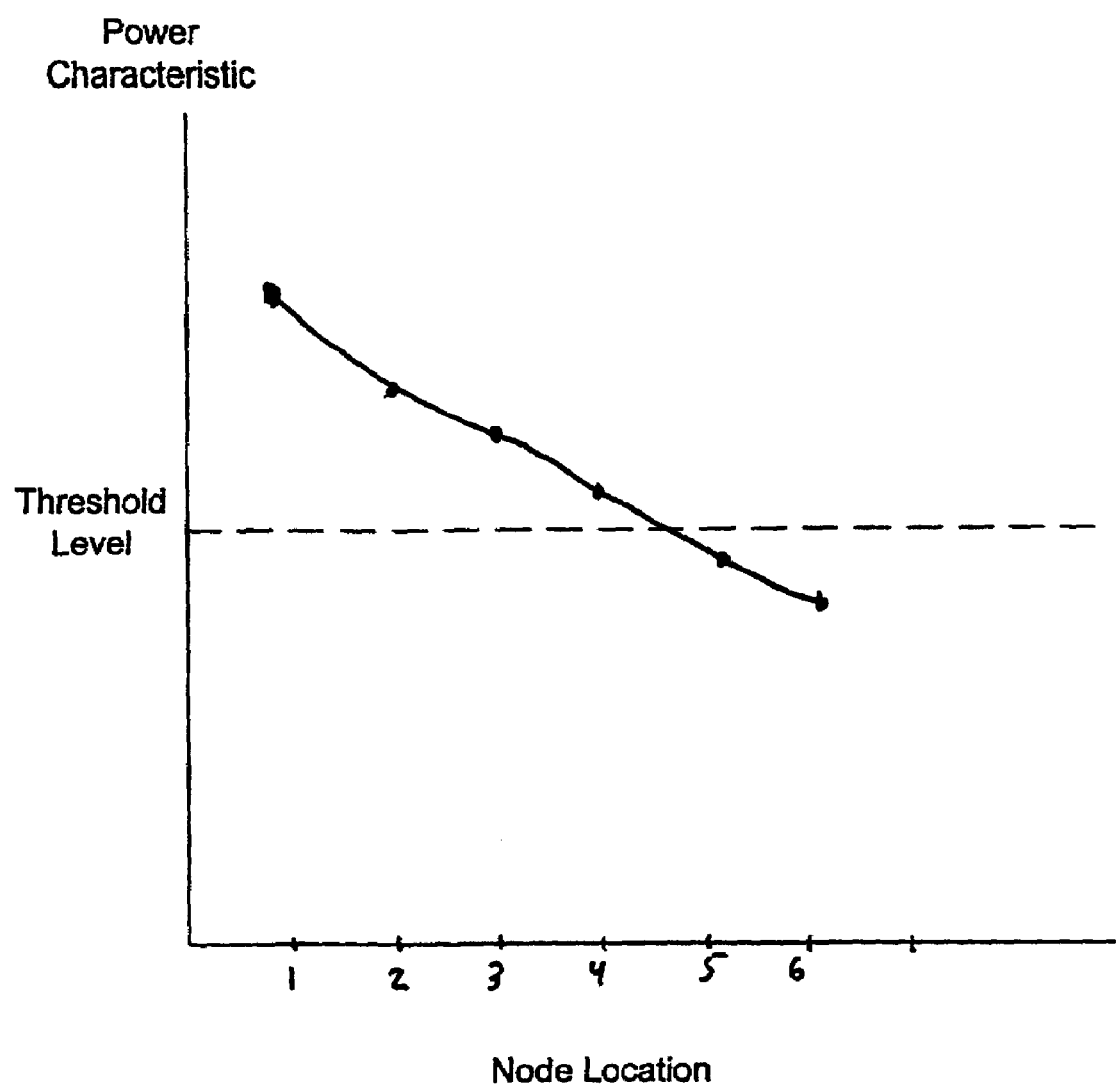
FIG. 13B is an illustrative plot of an optical power characteristic for a wavelength channel along its optical path between a start node and a termination node.

As indicated in FIG. 13B, for each optical wavelength channel, a plot of an optical power characteristic in each node may be formed relative to a starting node. The power characteristic (e.g., power level) may degrade with each successive node unless there are a sufficient number of optical amplifiers placed along the optical path of the wavelength channel.

Figure 13C:
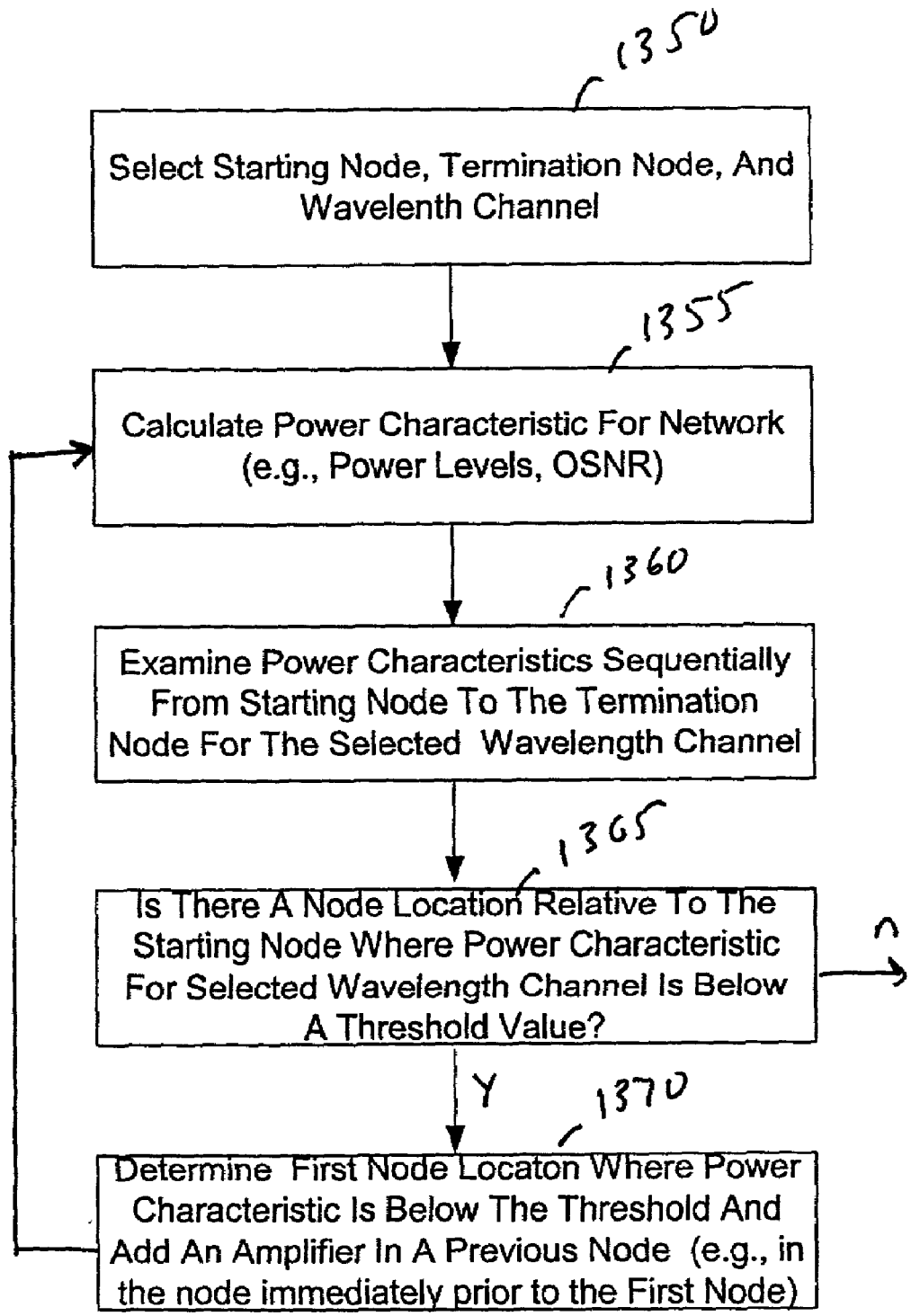
FIG. 13C is a flow chart of a method of sequentially placing optical amplifiers.

Referring to the flow chart of FIG. 13C, in one embodiment, at least one starting node, termination node, and wavelength channel is selected 1350. A power characteristic is calculated for the network 1355. The power characteristic of a wavelength channel are examined sequentially from a starting node 1360. A determination is made 1365 whether the power characteristic is satisfactory at each node of the entire optical path. If the power characteristic is acceptable over the entire optical path the process is complete for the wavelength channel, although additional wavelength channels with different starting and termination nodes may also be tested. If the power characteristics is not acceptable for each node over the entire optical path, an optical amplifier is placed. The optical amplifier is placed in a location along the optical path prior to the node location where the power characteristic fell below the threshold value. In one embodiment, the optical amplifier is placed in the first node location along the optical path prior to the node location where the optical power level falls below the threshold value. It will be understood, however, that other rules may also be applied that place the optical amplifier in a location along the optical path prior to where the power characteristic decreased below a threshold value.

Once an additional amplifier is placed, the power characteristic is recalculated and the process continued until the selected wavelength channel has acceptable power characteristics. In one embodiment, if an added amplifier fails to correct the power characteristic it is removed from consideration and an amplifier is added at a previous node location, i.e., the algorithm begins by placing an amplifier closest to the point where the power characteristic fails and moves progressively back along the optical path to attempt to find a node location where adding an amplifier sufficiently improves the optical power characteristic. If necessary, the process can include provision for a nested sequence of amplifier placements to add two or more amplifiers, if necessary, to improve the optical power characteristic.

In one embodiment, the power characteristic is calculated using an optical link analysis (OLA). OLA is a technique developed at ONI Systems Corp. of San Jose, Calif. to analyze optical networks. In OLA, the optical path from an optical transmitter to the receiver is simulated. Where applicable, a Power Management Algorithm (PMA) is also preferably performed to achieve a balancing of the power in the different optical amplifiers of the network. A particular arrangement of optical amplifiers (preamplifiers or postamplifiers) in an optical network can be modeled using OLA to test if the arrangement passes pre-selected optical network performance criteria If a low power condition is detected at a particular node, the path back through the optical sub-elements of the node is traced to find the first position that an optical amplifier can be placed. This is performed iteratively until OLA results in an acceptable configuration. A preferred embodiment of an iterative path search algorithm includes: 1) running the OLA simulation for a particular optical network; 2) examining the signal paths of the services to form a map of the optical characteristics of the optical channels at each node of the network; 3) and stopping if the network has acceptable characteristics. If an unacceptable low power error is detected at a node, the algorithm traces the optical path back through the optical elements of the node until the first appropriate place for an amplifier is found. In one embodiment, each amplifier configuration previously tested (and failed) is eliminated such that with each iteration the first appropriate place is traced further back along the optical path. In one embodiment the algorithm adds at least one amplifier, adding at most one east-facing and one west-facing amplifier per iteration (unbalanced amplifiers frequently cause the PMA to fail). This algorithm then returns to step 1 for a maximum of 2n+1 iterations.

This path search algorithm worked in about 80% of cases tested and is computationally efficient, i.e., there are at most 2n+1 iterations in which OLA needs to be performed. However, the order in which it decides to place amps is determined according to the order in which the services were added. This can cause the PMA to fail for some optical networks. This is because the PMA can handle only a certain amount of east/west power differential on the two sides of a node before the powers become un-balanceable. Thus, this approach is preferably combined with other techniques. For example, if the algorithm result in a configuration for which PMA fails, an alternate technique, such as the heuristic technique describe below, may be employed.

Iterations Around a Design Point

It is desirable to select an amplifier placement that has a minimal number of optical amplifiers and a high QOS. After any of the previous algorithms selects an initial design, design iterations may be created for further analysis. In one embodiment, after a design is selected having an integer number, m, of amplifiers, all configurations having a total of m amplifiers are analyzed. In another embodiment, if the algorithm selects an initial design, the losses of the spans and/or the nodes is varied by a predetermined percentage to identify other possible solutions.

This algorithm may also be expanding to include forming permutations of non-fixed amplifier placements in the original design and in each design iteration.

Computational Benefits and Network Benefits

In accord with one embodiment of present invention, one or more algorithms are used to select a subset of possible optical amplifier placement configurations for a detailed quality of service analysis. This greatly reduces the computational difficulty compared with performing a quality of service analysis for all possible optical amplifier placement configurations.

As an illustrative example of the some of the benefits associated the present invention, suppose that an optical system has a total of n nodes, where n is an integer. Assume that there can be zero, one, or two optical preamps per node and zero, one, or two optical postamps per node. For such a network, there can be up to 2n preamps and 2n postamps in the system. In this example, the number of possible optical amplifier arrangements is $2^{4n}$. The total number of optical amplifier arrangements increases rapidly as the number of nodes increases in the optical network, as indicated in Table II. While analysis tools exist to calculate the quality of service (QOS) from first principles, such analysis tools typically consume a significant amount of computational time, $T_i$, to analyze a single network configuration. For example, the OLA and a power management algorithm (PMA) developed by ONI Systems Corp., Inc. of San Jose, Calif., running on a conventional workstation requires about 15-30 seconds to perform each instance of a QOS analysis for an OC-48 compliant network and up to 5 minutes for each instance of a QOS analysis for an OC-192 compliant network. As a rough approximation, the total computational time for a network with n nodes will increase approximately as n×2 where $2^{4n}$ is the number of possible amplifier configurations and the number of amplifier configurations is multiplied by n to account for the increasing complexity of possible services as the number of nodes increases. The total time will also depend on the type of service analyzed, with each analysis of OC-192 compliant services requiring approximately one hundred times the computation time of OC-48 compliant services. As indicated in Table II, with even as few as four nodes a prohibitive amount of computational time may be required to analysis all possible amplifier configurations.

TABLE II

Optical Amplifier Placement Table

| Nodes | Total Number Of Amplifier Configurations | Time For OC-48 Analysis Of All Possible Configurations | Time For OC-192 Analysis Of All Possible Configurations |
|---|---|---|---|
| 2 | 256 | 1 second | 1.7 minutes |
| 3 | ~4096 | 25 seconds | 41 minutes |
| 4 | ~65,536 | 8.73 minutes | 14.6 hours |
| 5 | ~1,048,576 | 2.91 hours | 12.14 days |
| 6 | ~16.7 million | 2.33 days | 233 days |
| 7 | ~268 million | 43.5 days | 11.9 years |
| 8 | ~4.3 billion | 2.18 years | 218 years |
| 9 | ~68.7 billion | 39.2 years | 3,922 years |
| 10 | ~1.1 trillion | 697 years | 60,730 years |

In a practical design system it is typically necessary to complete an analysis within a time period typically less than about 12 hours (e.g., the time period for an overnight analysis). As can be seen in Table II, it is impractical to perform a QOS analysis for every possible optical amplifier placement configuration for networks having four or more nodes for an OC-192 compliant analysis.

By way of contrast, the method of the present invention greatly reduces the number of amplifier placement configurations that must be analyzed. This makes it practical to perform a QOS analysis using computational intensive analysis techniques to select a design having a minimal number of optical amplifiers and a high QOS. Consequently, the method of the present invention may be used to make an optical network having a reduced number of optical amplifiers and/or improved QOS.

While the present invention has been discussed in detail with regard to implementations with zero or one preamplifier for each input fiber, it will be understood that more generally the number of preamplifiers may vary from a minimum number to a maximum number. Additionally, it will be understood that the of post-amplifiers coupled to each output fiber may also be varied from a minimum number to a maximum number.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. For a wavelength division multiplexed optical network having a plurality of optical nodes coupled by spans with each optical node capable of receiving at least one optical pre-amplifier for each input fiber and at least one optical post-amplifier for each output fiber, a computer implemented method of selecting amplifier placement, the method comprising:

selecting optical services between the plurality of optical nodes, wherein the optical services comprise a plurality of channels, wherein each of the plurality of channels comprises a source node and a destination node, and wherein the plurality of optical nodes are configured in a mesh, ring, or combination thereof topology;

selecting an optical power criterion for constraining an initial placement of one or more optical amplifiers in the optical network, the optical power criterion being indicative of a sufficient minimum received power in at least one receiver;

wherein the optical power criterion constrains by a node loss algorithm wherein it is determined if a given node has an internal node loss for one or more of the plurality of channels that exceeds a predetermined level, and one or more of a span loss algorithm wherein it is determined if a given span has an internal span loss for one or more of the plurality of channels that exceeds a predetermined level, the span loss algorithm taking into account the internal span loss of a given fiber and one or more transmitter/receiver to output port/input port equivalent losses at one or more end nodes of the span, a path loss algorithm wherein the span loss algorithm is extended to include non-adjacent nodes, an aggregate loss algorithm wherein it is determined if one or more nodes have an aggregate span and band loss for one or more of the plurality of channels that exceeds a predetermined level, and a sequential path search algorithm wherein the power characteristics of one or more of the plurality of channels are analyzed from the source node to the destination node;

placing at least one amplifier in accord with the optical power criterion to form the initial placement of amplifiers; and determining a subsequent set of amplifier placement configurations which are consistent with and constrained by the initial placement of amplifiers, wherein constrained by the initial placement of amplifiers comprises one of analyzing all possible configurations of amplifiers having the same number of amplifiers as the initial placement and varying losses of the spans and nodes from the initial placement by a predetermined percentage to identify other possible configurations.

2. The method of claim 1, wherein the optical power criterion comprises:

placing an amplifier in a pre-selected node location responsive to an optical loss associated with at least one portion of a lightpath of the network exceeding a threshold loss.

3. The method of claim 1, wherein the optical criterion comprises:

analyzing the power level of at least one wavelength channel from a source node and placing an amplifier at a node location prior to a first node location in which the power level decreases below a threshold power level.

4. The method of claim 1, wherein the optical power criterion comprises:

calculating an aggregate loss for all of the spans and all of the nodes; and forming a constraint on the number of amplifiers required in the optical network by determining an aggregate number of amplifiers required for the aggregate optical loss.

5. The method of claim 1, further comprising:

performing a quality of service analysis upon each of the amplifier placement configurations; and selecting the amplifier placement configuration having a desired level of service and a minimum number of optical amplifiers.

6. An optical network designed by the method of claim 5.

7. An optical network designed by the method of claim 1.

8. For a wavelength division multiplexed optical network having a plurality of optical nodes coupled by spans with each optical node capable of receiving at least one optical pre-amplifier for each input fiber and at least one optical post-amplifier for each output fiber, a computer implemented method of selecting amplifier placement, the method comprising:

selecting optical services between the plurality of optical nodes, wherein the optical services comprise a plurality of light paths, wherein each of the plurality of light paths comprises a source node and a destination node, and wherein the plurality of optical nodes are configured in a mesh, ring, or combination thereof topology;

for each selected light path, placing optical amplifiers in node locations requiring optical amplification to form an initial placement of amplifiers;

wherein the optical power criterion constrains by a node loss algorithm wherein it is determined if a given node has an internal node loss for one or more channels that exceeds a predetermined level, and one or more of a span loss algorithm wherein it is determined if a given span has an internal span loss for one or more channels that exceeds a predetermined level, the span loss algorithm taking into account the internal span loss of a given fiber and one or more transmitter/receiver to output port/input port equivalent losses at one or more end nodes of the span, a path loss algorithm wherein the span loss algorithm is extended to include non-adjacent nodes, an aggregate loss algorithm wherein it is determined if one or more nodes have an aggregate span and band loss for one or more channels that exceeds a predetermined level, and a sequential path search algorithm wherein the power characteristics of one or more channels are analyzed from add point to drop point;

determining a subsequent set of amplifier placement configurations which are consistent with and constrained by the initial placement of amplifiers, wherein constrained by the initial placement of amplifiers comprises one of analyzing all possible configurations of amplifiers having the same number of amplifiers as the initial placement and varying losses of the spans and nodes from the initial placement by a predetermined percentage to identify other possible configurations.

9. The method of claim 8, wherein an optical amplifier is placed in a node location responsive to an optical loss associated with at least one portion of the lightpath exceeding a threshold loss.

10. The method of claim 8, further comprising:

analyzing the power level of at least one wavelength channel from a source node and placing an amplifier at a node location prior to a first node location in which the power level decreases below a threshold power level.

11. The method of claim 8, further comprising:

calculating an aggregate loss for all of the spans and all of the nodes; and forming a constraint on the number of amplifiers required in the optical network by determining an aggregate number of amplifiers required for the aggregate optical loss.

12. The method of claim 8, further comprising:

performing a quality of service analysis upon each of the amplifier placement configurations; and selecting the amplifier placement configuration having a desired level of service and a minimum number of optical amplifiers.

13. An optical network designed by the method of claim 12.

14. An optical network designed by the method of claim 8.

15. A computer implemented method for designing a wavelength division multiplexed optical network, the method comprising:

providing an interface for a user to input an arrangement of optical nodes coupled by optical fiber spans, each of the optical fiber spans having an associated optical fiber loss that is dependent upon its length and upon an attenuation characteristic of the span, wherein the arrangement comprises one of a ring, mesh, and combination thereof;

each node having a minimum and a maximum number of possible optical pre-amplifiers which may be coupled to each of its input ports and a minimum and a maximum number of possible optical post-amplifiers which may be coupled to each of its output ports, the optical network having an associated multiplicity of possible optical amplifier placement configurations;

for each node of the optical network, configuring optical components of optical add/drop multiplexers to add, drop, and pass through optical wavelength channels according to a channel map for providing services in the optical network, the optical components of the node having an associated optical loss characteristic;

selecting optical services between the optical nodes, wherein the optical services comprise a plurality of channels, wherein each of the plurality of channels comprises a source node and a destination node;

selecting an initial set of optical amplifier placement configurations, the selection constrained by a node loss algorithm wherein it is determined if a given node has an internal node loss for one or more of the plurality of channels that exceeds a predetermined level, and one or more of a span loss algorithm wherein it is determined if a given span has an internal span loss for one or more of the plurality of channels that exceeds a predetermined level, the span loss algorithm taking into account the internal span loss of a given fiber and one or more transmitter/receiver to output port/input port equivalent losses at one or more end nodes of the span, a path loss algorithm wherein the span loss algorithm is extended to include non-adjacent nodes, an aggregate loss algorithm wherein it is determined if one or more nodes have an aggregate span and band loss for one or more of the plurality of channels that exceeds a predetermined level, and a sequential path search algorithm wherein the power characteristics of one or more of the plurality of channels are analyzed from source node to the destination node;

analyzing quality of service for each optical amplifier placement configuration in the set of optical amplifier placement configurations, wherein the quality of service comprises power level of every channel in the channel map and one or more of optical signal to noise ratio, bit error rate, and combination thereof; and selecting a subsequent set of optical amplifier placement configurations having a minimum number of optical amplifiers and a desired quality of service, wherein the subsequent set of optical amplifier placement configurations are consistent with and constrained by the initial set of optical amplifier placement configurations, and wherein constrained by the initial placement of amplifiers comprises one of analyzing all possible configurations of amplifiers having the same number of amplifiers as the initial placement and varying losses of the spans and nodes from the initial placement by a predetermined percentage to identify other possible configurations.

16. The method of claim 15, wherein selecting the set comprises:

selecting an optical power criterion for constraining placement of one or more optical amplifiers in the optical network, the optical power criterion being indicative of a sufficient minimum received power in at least one receiver;

placing at least one amplifier in accord with the optical power criterion to form an initial placement of amplifiers; and determining a set of amplifier placement configurations which are consistent with the initial placement of amplifiers.

17. The method of claim 15, wherein selecting the set comprises:

for a node having at least one channel passing through the node, determining a pass-through optical loss associated with the at least one channel passing through the optical node; and responsive to the pass-through optical loss exceeding a threshold loss, placing at least one amplifier in the node.

18. The method of claim 15, wherein selecting the set comprises:

for at least one optical wavelength channel, forming an equivalent optical circuit model having an associated equivalent optical loss to couple a wavelength channel from a first node to a second node in the network; and responsive to the equivalent optical loss exceeding a threshold optical loss, placing an optical amplifier in at least one of the nodes.

19. The method of claim 18, wherein the first and second nodes comprise an optical add/drop path, the minimum equivalent loss includes the losses along the add/drop path, and the optical amplifier is placed in one of the nodes along the add/drop path.

20. The method of claim 15, wherein selecting the set comprises:

for at least one optical wavelength channel that is added and dropped, sequentially moving from an add node to each subsequent node along an optical path to a drop node;

at each node in the sequence of nodes along the optical path, determining if an optical amplifier is required to couple the optical wavelength signal to a subsequent node; and responsive to determining that an optical amplifier is required to couple the optical wavelength channel to a subsequent node, placing an amplifier in a node location selected to couple the optical wavelength signal to the subsequent node.

21. The method of claim 20, further comprising:

performing a power analysis of the wavelength channel along the optical path for an initial optical amplifier configuration; and responsive to the wavelength channel having a power level below a threshold power level in a node, placing an optical amplifier in a previous node.

22. The method of claim 15, wherein selecting the set comprises:

placing amplifiers proximate high loss regions of the optical network.

23. The method of claim 15, wherein selecting the set further comprises:

eliminating from consideration amplifier configurations belonging to branches of a decision tree likely to have unacceptably low power for at least one wavelength channel in at least one node.

24. The method of claim 15, where selecting the set comprises:

placing an optical amplifier in a node, responsive to the optical loss of the node for at least one pass-through channel exceeding a first threshold loss; and placing at least one amplifier proximate one end of a span responsive to determining a path loss for a wavelength channel added in a first node traveling along an optical path including the span to a second node exceeding a second threshold loss.

25. The method of claim 24, further comprising:

forming configurations having at least one additional optical amplifier.

26. The method of claim 15, wherein selecting the set further comprises:

calculating an aggregate optical loss for all of the spans and all of the nodes; and forming an estimate of the number of amplifiers required in the optical network by determining an aggregate number of amplifiers required for the aggregate optical loss.

27. An optical network designed by the method of claim 15.

28. A network design tool for a wavelength division multiplexed optical network in which each optical node is capable of receiving a plurality of optical amplifiers, comprising:
design means for selecting a plurality of optical services within the optical network, wherein the plurality optical services comprise a plurality of channels, wherein each of the plurality of channels comprises a source node and a destination node, and wherein the optical network is configured in a mesh, ring, or combination thereof topology;
selection means for placing at least one optical amplifier to form an initial placement in accord with an optical power criteria;
wherein the initial placement is constrained by a node loss algorithm wherein it is determined if a given node has an internal node loss for one or more of the plurality of channels that exceeds a predetermined level, and one or more of a span loss algorithm wherein it is determined if a given span has an internal span loss for one or more of the plurality of channels that exceeds a predetermined level, the span loss algorithm taking into account the internal span loss of a given fiber and one or more transmitter/receiver to output port/input port equivalent losses at one or more end nodes of the span, a path loss algorithm wherein the span loss algorithm is extended to include non-adjacent nodes, an aggregate loss algorithm wherein it is determined if one or more nodes have an aggregate span and band loss for one or more of the plurality of channels that exceeds a predetermined level, and a sequential path search algorithm wherein the power characteristics of one or more of the plurality of channels are analyzed from the source node to the drop node;
means for forming a subsequent set of optical amplifier placement configurations in accord with and constrained by the initial placement of the selections means, wherein constrained by the initial placement of selections means comprises one of analyzing all possible configurations having the same number of amplifiers as the initial placement and varying losses of the spans and nodes from the initial placement by a predetermined percentage to identify other possible configurations; and
quality of service means to analyze the quality of service of each amplifier placement configuration, wherein the quality of service comprises power level of every channel in the channel map and one or more of optical signal to noise ratio, bit error rate, and combination thereof.

29. A network design tool, comprising:
a network configuration module for configuring optical components of nodes of an optical network to add, drop, and pass-through wavelength channels according to a channel map, wherein the optical network is configured in a mesh, ring, or combination thereof topology;
an amplifier placement selection module for selecting a subset of amplifier placement configurations from the set of all possible amplifier placement configurations, the selection constrained by a node loss algorithm wherein it is determined if a given node has an internal node loss for one or more channels that exceeds a predetermined level, and one or more of a span loss algorithm wherein it is determined if a given span has an internal span loss for one or more channels that exceeds a predetermined level, the span loss algorithm taking into account the internal span loss of a given fiber and one or more transmitter/receiver to output port/input port equivalent losses at one or more end nodes of the span, a path loss algorithm wherein the span loss algorithm is extended to include non-adjacent nodes, an aggregate loss algorithm wherein it is determined if one or more nodes have an aggregate span and band loss for one or more channels that exceeds a predetermined level, and a sequential path search algorithm wherein the power characteristics of one or more channels are analyzed from add point to drop point; and
a quality of service analysis module configured to analyze the quality of service for each amplifier configuration of the subset of amplifier placement configurations and select an amplifier configuration having a minimum number of amplifiers and a desired quality of service, wherein the quality of service comprises power level of every channel in the channel map and one or more of optical signal to noise ratio, bit error rate, and combination thereof, and wherein the quality of service analysis module is further configured to perform power balancing;
wherein the selecting a subset of amplifier placement configurations comprises selecting an initial placement of amplifier configurations and selecting a subsequent set of optical amplifier placement configurations in accord with and constrained by the initial placement of amplifier configurations; and
wherein constrained by the initial placement of amplifier configurations comprises one of analyzing all possible configurations having the same number of amplifiers as the initial placement and varying losses of the spans and nodes from the initial placement by a predetermined percentage to identify other possible configurations.

30. The system of claim 29, wherein the amplifier placement selection module places amplifiers proximate high loss regions of the optical network.

31. The system of claim 29, wherein the amplifier placement selection module eliminates from consideration amplifier configurations belonging to branches of a decision tree likely to have unacceptably low power for at least one wavelength channel in at least one node.

32. A wavelength division multiplexed optical network, comprising:
at least four optical nodes coupled by fiber optic spans, wherein the optical network is configured in a mesh, ring, or combination thereof topology;
each node having an optical add/drop multiplexer and each node capable of receiving at least one optical pre-amplifier for each input fiber and at least one optical post amplifier for each output fiber; and
at least one optical amplifier disposed in the nodes, wherein the configuration of the at least one optical amplifier is selected and validated by a design tool;
wherein the design tool comprises:
design means for selecting a plurality of optical services within the optical network, wherein the plurality optical services comprise a plurality of channels, wherein each of the plurality of channels comprises a source node and a destination node, and wherein the optical network is configured in a mesh, ring, or combination thereof topology;

selection means for placing at least one optical amplifier to form an initial placement in accord with an optical power criteria;

wherein the initial placement is constrained by a node loss algorithm wherein it is determined if a given node has an internal node loss for one or more of the plurality of channels that exceeds a predetermined level, and one or more of a span loss algorithm wherein it is determined if a given span has an internal span loss for one or more of the plurality of channels that exceeds a predetermined level, the span loss algorithm taking into account the internal span loss of a given fiber and one or more transmitter/receiver to output port/input port equivalent losses at one or more end nodes of the span, a path loss algorithm wherein the span loss algorithm is extended to include non-adjacent nodes, an aggregate loss algorithm wherein it is determined if one or more nodes have an aggregate span and band loss for one or more of the plurality of channels that exceeds a predetermined level, and a sequential path search algorithm wherein the power characteristics of one or more of the plurality of channels are analyzed from the source node to the drop node;

means for forming a subsequent set of optical amplifier placement configurations in accord with and constrained by the initial placement of the selections means, wherein constrained by the initial placement of selections means comprises one of analyzing all possible configurations having the same number of amplifiers as the initial placement and varying losses of the spans and nodes from the initial placement by a predetermined percentage to identify other possible configurations; and quality of service means to analyze the quality of service of each amplifier placement configuration, wherein the quality of service comprises power level of every channel in the channel map and one or more of optical signal to noise ratio, bit error rate, and combination thereof.

33. The network of claim 32, wherein the network provides OC-192 compliant services.

34. The network of claim 32, wherein the network has at least five nodes.

* * * * *